United States Patent [19]

Mizumoto et al.

[11] Patent Number: 5,727,240
[45] Date of Patent: Mar. 10, 1998

[54] DEVICE FOR JUDGING AN UNEXPOSED FRAME OF A FILM

[75] Inventors: Kenji Mizumoto, Osaka; Satoshi Hamada, Sakai, both of Japan

[73] Assignee: Minolta Co., Ltd., Osaka, Japan

[21] Appl. No.: 659,689

[22] Filed: Jun. 6, 1996

[30] Foreign Application Priority Data

Jun. 9, 1995 [JP] Japan ................. 7-143008

[51] Int. Cl.$^6$ ............... G03B 19/02; G03B 17/24
[52] U.S. Cl. ............ 396/210; 396/319; 396/389; 396/390
[58] Field of Search ............... 396/210, 310, 396/319, 389, 390

[56] References Cited

U.S. PATENT DOCUMENTS

| | | |
|---|---|---|
| 5,017,326 | 5/1991 | Wash et al. ................. 396/390 |
| 5,032,854 | 7/1991 | Smart et al. ................. 396/207 |
| 5,281,987 | 1/1994 | Nagata ................. 396/210 |
| 5,325,138 | 6/1994 | Nagata ................. 396/319 |
| 5,416,545 | 5/1995 | Izukawa ................. 396/319 |
| 5,432,570 | 7/1995 | Ueda et al. ................. 396/319 |
| 5,477,289 | 12/1995 | Smart ................. 396/319 |
| 5,617,161 | 4/1997 | Serita et al. ................. 396/319 |

*Primary Examiner*—Eddie C. Lee
*Attorney, Agent, or Firm*—Burns, Doane, Swecker & Mathis, LLP

[57] ABSTRACT

A judging device for judging an unexposed frame of a film having a magnetic recording portion recordable with a magnetic signal, includes: a magnetic header for scanning the magnetic recording portion; a divider for dividing the magnetic recording portion into a plurality of blocks; a first judger for judging whether blocks bear a magnetic signal block by block; and a second judger for judging whether the frame corresponding to the magnetic recording portion has been exposed.

15 Claims, 20 Drawing Sheets

FIG. 12

| | a0 | a1 | a2 | a3 | a4 | a5 | a6 | a7 | a8 | a9 | a10 | a11 | a12 | a13 | a14 | a15 | a16 |
|---|---|---|---|---|---|---|---|---|---|---|---|---|---|---|---|---|---|
| DATA TRAIN SIGNAL Db | 0 | 1 | 1 | 1 | 0 | 0 | 1 | 1 | 0 | 1 | 1 | 1 | 0 | 1 | 1 | 1 | 1 |
| DATA TRAIN SIGNAL Dbih1 | b0 | b1 | b2 | b3 | b4 | b5 | b6 | b7 | b8 | b9 | b10 | b11 | b12 | | | | |
| | 1 | 1 | 1 | 1 | 0 | 1 | 1 | 1 | 1 | 1 | 1 | 1 | 1 | | | | |
| DATA TRAIN SIGNAL Dbih2 | c0 | c1 | c2 | c3 | c4 | c5 | c6 | c7 | | | | | | | | | |
| | 1 | 1 | 1 | 1 | 1 | 1 | 1 | 1 | | | | | | | | | |

FIG. 13

| DATA TRAIN SIGNAL Db | a0 | a1 | a2 | a3 | a4 | a5 | a6 | a7 | a8 | a9 | a10 | a11 | a12 | a13 | a14 | a15 | a16 |
|---|---|---|---|---|---|---|---|---|---|---|---|---|---|---|---|---|---|
| | 0 | 1 | 1 | 0 | 0 | 0 | 1 | 1 | 0 | 1 | 0 | 0 | 0 | 1 | 1 | 1 | 1 |
| DATA TRAIN SIGNAL Dbih1 | b0 | b1 | b2 | b3 | b4 | b5 | b6 | b7 | b8 | b9 | b10 | b11 | b12 | | | | |
| | 0 | 0 | 0 | 0 | 0 | 1 | 1 | 0 | 0 | 0 | 0 | 1 | 1 | | | | |
| DATA TRAIN SIGNAL Dbih2 | c0 | c1 | c2 | c3 | c4 | c5 | c6 | c7 | | | | | | | | | |
| | 0 | 0 | 0 | 0 | 0 | 0 | 0 | 0 | | | | | | | | | |

DEVICE FOR JUDGING AN UNEXPOSED FRAME OF A FILM

BACKGROUND OF THE INVENTION

This invention relates to a device for judging whether a given frame of a film is unexposed based on a signal from a recording portion corresponding to the frame while the film is fed by a film feeder.

A known silver-salt film for use with a camera is provided with magnetic recording portions in correspondence with respective frames in which information concerning the photographing such as a date of photography and an exposure value (hereinafter, film photographic information) are magnetically recorded. The information is magnetically recorded in the film, for example, as follows. While the film is wound, the photographic information corresponding to the frame is recorded in the form of a magnetic signal including a pulse train signal.

The film photographic information is used when prints are made from the exposed film. In addition, this information is used to detect a leading unexposed frame based on the presence or absence thereof, for example, in the case that the photographing is to be made to still unexposed frames of a film which was rewound before all frames were exposed. A known unexposed frame judging device judges whether the frame is unexposed by judging whether the film photographic information is recorded in the magnetic recording portions of the respective frames.

FIG. 22 is a circuit construction diagram of a magnetic signal judger provided in a prior art device for judging an unexposed frame by judging whether a signal picked up from a magnetic recording portion of a film represents the film photographic information (magnetic signal).

A prior art magnetic signal judger 100 includes a magnetic head 101 for picking up a magnetic signal recorded in a magnetic recording portion of a film F, a magnetic signal detecting circuit 102 for amplifying the picked up signal (hereinafter, pick-up signal) to a specified voltage level, and a magnetic signal judging circuit 103 for judging whether the pick-up signal is a normal magnetic signal.

The judging circuit 103 extracts an alternate current (ac) component Vb from an output signal Va of the magnetic sional detecting circuit 102 by removing a direct current (dc) component therefrom, generates a pulsating current signal Vc (a signal corresponding to an envelop level of an amplitude variation of the ac component Vb) including a low frequency component by rectifying and smoothing the ac component Vb, and judges whether the pick-up signal is a normal magnetic signal by comparing the pulsating current signal Vc with a reference voltage Vref input from a camera CPU 107.

A CR circuit including a capacitor C1 and a resistor R1 at an input side of the judging circuit 103 extracts only the ac component Vb from the output signal Va. A diode D downstream from the CR circuit rectifies the extracted ac component Vb. Further, CR circuits including capacitors C2, C3 and resistors R2, R3 downstream from the diode D smooth the rectified ac component Vb and generate the pulsating current signal Vc. A comparator COMP compares the pulsating current signal Vc and the reference voltage Vref, and outputs a high level signal Vd representing that the pick-up signal is a normal magnetic signal if the pulsating current signal Vc rises above the reference voltage Vref, while outputting a low level signal Vd representing that the pick-up signal is not a normal magnetic signal if the pulsating current signal Vc falls below the reference voltage Vref.

Whether the film photographic information is recorded in the magnetic recording portion of each frame of the film is judged as follows.

A feed roller 104 is rotated by a feed motor 105 to feed the film F in a winding direction while the magnetic head 101 is pressed against the magnetic recording portion of the film F. The signal recorded in the magnetic recording portion is picked up by detecting a voltage induced at the opposite ends of the magnetic head 101 by electromagnetic induction. The feed speed and feed direction of the film are controlled by controlling the rotating speed and rotating direction of the feed motor 105 by a motor driver 106.

After the detecting circuit 102 amplifies the signal picked up by the magnetic head 101 to the specified voltage level, the judging circuit 103 generates the pulsating current signal Vc corresponding to the envelop level of the amplitude variation of the pick-up signal, judges whether the pick-up signal is a normal magnetic signal representing the film photographic information by comparing the pulsating current signal Vc with the reference voltage Vref, and outputs a signal representing the comparison result (the output signal Vd of the comparator COMP) to the camera CPU 107.

The prior art magnetic signal judger 100 picks up the signal in the magnetic recording portion of the film F, extracts from the pick-up signal the pulsating current signal Vc which is a low frequency component of the amplitude variation of the pick-up signal, and judges based only on the level of the pulsating current signal Vc whether the pick-up signal is a normal magnetic signal. Accordingly, there is an undesirable likelihood that the pick-up signal is erroneously judged due to a burst-shaped noise coming from outside, a variation in the level of the magnetic signal resulting from a signal-to-noise (S/N) characteristic of the magnetic recording portion and the feed of the film.

In comparison with magnetic tapes for recording audio and video signals, the magnetic recording portion of the film F has a magnetic layer of lower magnetic density, and does not necessarily have a sufficient S/N characteristic. Further, a mechanism for feeding the film F is not designed specially for reading the magnetic signals recorded in the film F. Accordingly, during the writing and reading, of the magnetic signal in and from the magnetic recording portion, the magnetic signal may have a lowered or missing level as shown in FIG. 23. Thus, despite the fact that the signal being written or read is a magnetic signal, it may be erroneously judged not to be a magnetic signal. In FIG. 23, A indicates a missing portion of the pick-up signal Va where the level thereof is a noise level.

Further, in the case that the above judgment is made near a television receiver, a scanning line noise of the television receiver may be included. Then, if the level of the pick-up signal Va which is not a normal magnetic signal is caused to largely vary by a burst-shaped noise Sb resulting from the scanning line noise as shown in FIG. 24, the noise Sb may be erroneously judged to be a normal magnetic signal.

The maloperation of the magnetic signal judger 100 may be solved by a suitable circuit construction. However, such a solution by hardware leads to a complicated circuit construction, and it is not easy to design such a circuit. This solution is not always effective in terms of a production cost. Therefore, it is difficult to adopt such a solution.

The maloperation of the magnetic signal judger 100 may be solved by A/D converting the pick-up signal, storing it in a memory and shaping its waveform by software. Such a method requires an exceedingly large memory, leading to an increased production cost, and it is therefore difficult to adopt such a method.

SUMMARY OF THE INVENTION

It is an object of the present invention to provide a device for judging an unexposed frame of a film which has overcome the problems residing in the prior art.

It is another object of the present invention to provide a device for judging an unexposed frame of a film which can accurately judge whether signals picked up from respective recording portions are representative of a film photographic information and, therefore, securely and accurately judge whether the respective frames are unexposed or exposed.

The present invention is directed to a judging device for judging an unexposed frame of a film having a magnetic recording portion recordable with a magnetic signal indicative of photographic information concerning an image for a frame. The judging device comprises: a magnetic head which scans the magnetic recording portion to produce scanned data; a divider which divides the magnetic recording portion into a plurality of blocks; a first judger which is responsive to the divider and judges based on scanned data whether blocks bear a magnetic signal block by block; and a second judger which is responsive to the first judger and judges based on respective judgment results for blocks of the first judger whether the frame corresponding to the magnetic recording portion has been exposed.

The second judger may be made to execute its judgment based on the number of consecutive blocks bearing a magnetic signal. The corresponding frame is judged to be exposed when the number of consecutive blocks bearing a magnetic signal is greater than a predetermined value. The corresponding frame is judged not to be exposed when the number of consecutive blocks bearing a magnetic signal is smaller than the predetermined value.

The second judger may be made to execute its judgment based on a result of moving average processing of judgment results of the first judger.

It may be appreciated that the above objectives can be achieved by dividing the magnetic recording portion in accordance with divisions of a time of the magnetic head relative to its scanning the magnetic recording portion. Also, it may be appreciated that the above objectives can be achieved by dividing the magnetic recording portion in accordance with divisions of a relative movement amount of the film and the magnetic head over the magnetic recording portion.

In the case that the magnetic signal is represented by a pulse having a specified width, it may be preferable to divide the magnetic recording portion at such an interval that each block covers the pulse.

Also, the present invention is directed to a method for judging an unexposed frame of a film having a magnetic recording portion recordable with a magnetic signal indicative of photographic information concerning an image for a frame, the method comprising the steps of: scanning the magnetic recording portion to produce scanned data; providing divisions over the magnetic recording portion; judging whether a magnetic signal is recorded on each division; and judging that the frame corresponding to the magnetic recording portion has been exposed when the number of consecutive divisions bearing a magnetic signal is greater than a predetermined value and that the corresponding frame has not been exposed when the number of consecutive divisions bearing a magnetic signal is smaller than the predetermined value.

Further, the present invention is directed to a method for judging an unexposed frame of a film having a magnetic recording portion recordable with a magnetic signal indicative of photographic information concerning an image for a frame, the method comprising the steps of: scanning the magnetic recording portion to produce scanned data; providing divisions over the magnetic recording portion; judging whether a magnetic signal is recorded on each division; executing a moving average processing to respective judgment results for divisions; and judging based on a result of the moving average processing whether the frame corresponding to the magnetic recording portion has been exposed.

With the thus constructed unexposed frame judging device, the magnetic recording portion is divided into a specified number of blocks. The first judger judges based on scanned data whether blocks bear a magnetic signal block by block. The second judger judges based on respective judgment results for blocks of the first judger whether the frame corresponding to a particular magnetic recording portion has been exposed. Accordingly, judgment of an unexposed frame can be made more securely and accurately.

In the unexposed frame judging method, the magnetic recording portion of a particular frame is divided into a specified number of blocks. The presence of a magnetic signal is judged for each block. The frame is judged to be exposed when the number of consecutive divisions bearing a magnetic signal is greater than a predetermined value. On the other hand, the frame is judged not to be exposed when the number of consecutive divisions bearing a magnetic signal is smaller than the predetermined value. Alternatively, a moving average processing is executed to respective judgment results for divisions and the frame is judged based on a result of the moving average processing. Accordingly, the inventive judging method will remarkably improve the accuracy in judgment of an unexposed frame.

These and other objects, features and advantages of the present invention will become more apparent upon a reading of the following detailed description and accompanying drawings.

BRIEF DESCRIPTION OF THE DRAWINGS

FIG. 12 is a diagram showing a data train signal when a moving average processing is applied to the data train signal of the signal Sp including Ix-signal in the second control system;

FIG. 13 is a diagram showing a data train signal when a moving average processing is applied to the data train signal of the signal Sp not including Ix-signal in the second control system;

DETAILED DESCRIPTION OF THE PREFERRED EMBODIMENTS OF THE INVENTION

Figure 1:
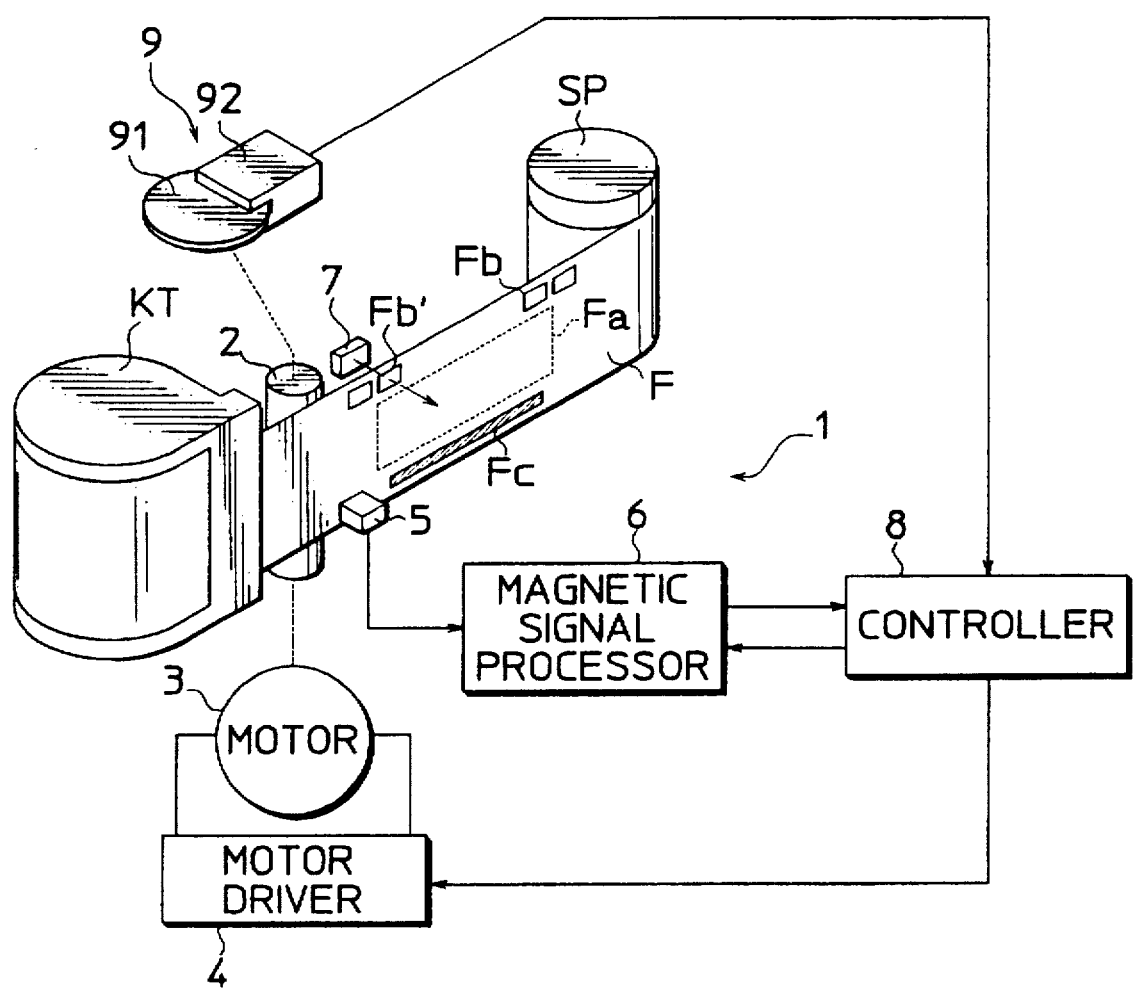
FIG. 1 is a schematic construction diagram of a device for judging an unexposed frame of a film in accordance with the present invention.

FIG. 1 is a schematic construction diagram of a device for judging unexposed frames of a film embodying the present invention.

In FIG. 1, the unexposed frame judging device is incorporated into a camera. A take-up spool SP is provided at one end of an unillustrated film loader of the camera, and a film F pulled out of a film cartridge KT loaded at the other end thereof is wound around the take-up spool SP. The take-up spool SP is driven to rotate in synchronism with a feed roller 2 for feeding the film F. The film F wound around the take-up spool SP is wound and rewound by simultaneously driving the take-up spool SP and the feed roller 2.

Figure 2:
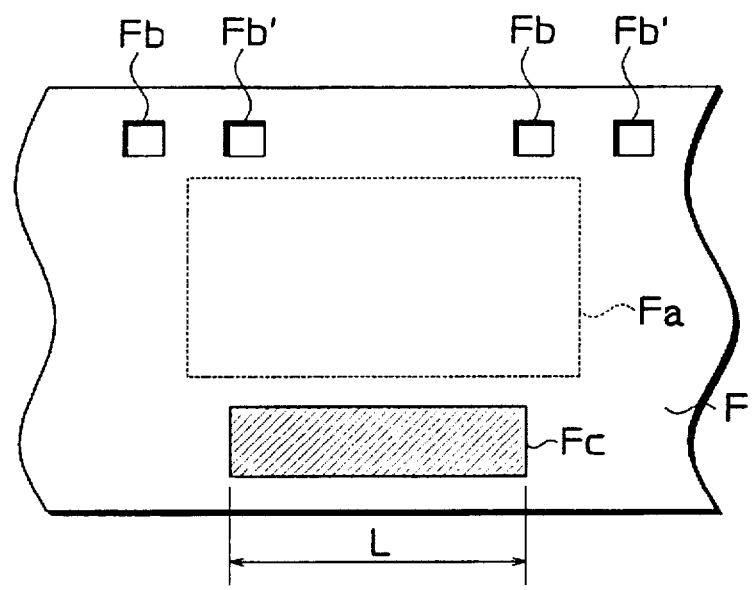
FIG. 2 is a diagram showing a magnetic recording portion provided on a film.

The film F is, as shown in FIG. 2, formed with a plurality of exposure areas (frames) Fa in its longitudinal direction. The film F is also formed, at one of its upper or lower edges (upper edge in FIG. 2), with pairs of perforations Fb, Fb' in correspondence with the respective frames Fa to indicate the positions thereof. The perforations Fb, Fb' indicate the leading end position and rear end position of the corresponding frame Fa with respect to a winding direction of the film F, respectively, and are formed in specified positions at opposite longitudinal ends of each frame Fa.

Each frame Fa of the film F is fed to a specified exposure position by detecting the perforations Fb, Fb' by means of a photoreflector 7 which is so disposed as to face a moving path of the perforations Fb, Fb' at an upstream side with respect to a feed direction of the film F. During a control executed to read a film photographic information, whether all frames Fa have been fed is judged in accordance with the detection signal of the photoreflector 7, thereby detecting the completion of the scanning of the film photographic information for all frames Fa.

At the other edge (lower edge in FIG. 2) of the film F, strip-like magnetic recording portion Fc for magnetically recording the film photographic information concerning the respective frames Fa are so formed as to correspond to the frames Fa. The length (scanning length) of each magnetic recording portion Fc is set at a given value e.g., 22 mm.

The film photographic information includes a plurality of kinds of information: a date of photographing, photographing conditions such as an exposure value and information as to whether an exposure correction was made, frame information as to whether an image was vertically or horizontally framed, and a print size (standard/panorama). The film photographic information is written in the magnetic recording portions by an unillustrated write head while the film is rewound after the photographing was conducted for all frames Fa.

Each information constituting the film photographic information is represented in a binary number data of a specified number of digits. In the magnetic recording portion Fc is written the binary number data consisting of data "0" and data "1" in the form of a bit signal Pb having a waveform shown in FIG. 3.

Figure 3:
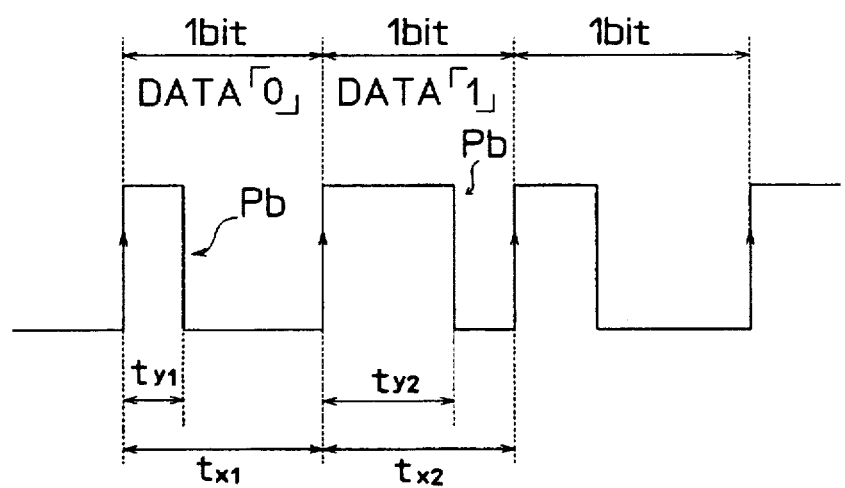
FIG. 3 is a diagram showing an exemplary waveform of a bit signal Pb constituting film photographic information.

The bit signal Pb shown in FIG. 3 is such that two kinds of pulse signals having different duty ratios (ty/tx) are allotted to the data "0" and the data "1". Since a cycle tx of the bit signal Pb changes, but the duty ratio (ty/tx) does not change according to a feed speed V of the film F, whether the respective portions of the bit signal Pb represents the data "0" or "1" is judged based on their duty ratios.

The signal (hereinafter, Ix-signal) representing the film photographic information and written in the magnetic recording portion Fc is determined to be a signal of at least 248 bits by standards. Since the length of the magnetic recording portion Fc is 22 mm, a minimum bit density Db is 11.3 bits/mm (=248 bits/22 mm). It should be noted that desired writing conditions which satisfy the above writing condition are selectable by the camera.

The feed speed V of the film F when the film photographic information is scanned from the magnetic recording portion Fc is set in a range of, e.g., 50 mm/s to 200 mm/s. Accordingly, a minimum frequency fmin of the Ix-signal to be picked up from the magnetic recording portion Fc is set at 563.6 Hz (=50 mm/s×11.3 bits/mm).

Referring back to FIG. 1, the judging device 1 includes the feed roller 2, a feed motor 3 for driving the feed roller 2, a motor driver 4 for controlling the rotating direction and rotating speed of the feed motor 3, a magnetic head 5 for picking up the Ix-signals recorded in the magnetic recording portions Fc of the film F, a magnetic signal processor 6 for amplifying the level of the signal picked up by the magnetic head 5 to a specified standard level, a controller 8 for centrally controlling the feed of the film F and the reading of the Ix-signal, and a pulse generator 9 for outputting a pulse according to the rotation of the feed roller 3.

The magnetic signal processor 6 has an output voltage range of, e.g., 0 to 5 V, and amplifies the signal picked up by the magnetic head 5 (a signal obtained by superimposing the processed bit signal Pb on a DC bias) into a signal having an amplitude of 2.5 V or smaller and centering on 2.5 V.

In the unexposed frame judging device 1 thus constructed, the feed motor 3 is driven to feed the film F at a predetermined feed speed V in the winding direction, and the signal in the magnetic recording portion Fc is picked up by scanning the magnetic recording portion Fc of each frame Fa. After being amplified to a standard voltage level in the magnetic signal processor 6, the pick-up signal is input to the controller 8. The controller 8 judges whether the pick-up signal includes the Ix-signal to judge whether the frame Fa corresponding to the magnetic recording portion Fc is unexposed.

Figure 4:
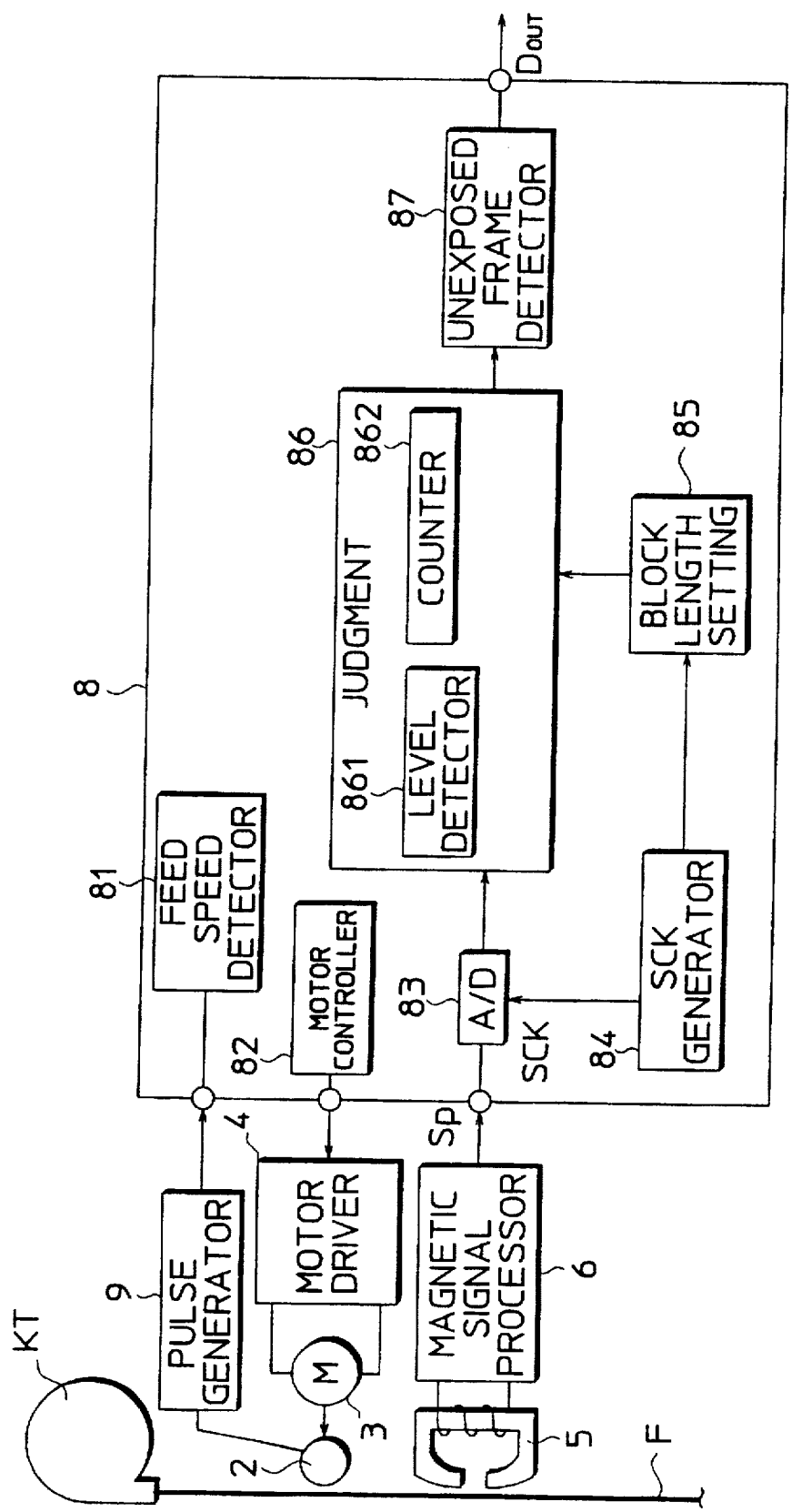
FIG. 4 is a block diagram of a first control system of the judging device.

FIG. 4 is a block diagram of a first control system of the unexposed frame judging device 1. In FIG. 4, the same elements as those shown in FIG. 1 are identified by the same reference numerals.

The feed motor 3 includes an electric motor such as a stepping motor. A drive transmission system for the feed motor 3 is constructed such that the film F is fed by one frame when the feed motor 3 makes a specified number of turns. When the film photographic information is scanned, the drive of the feed motor 3 is controlled by the motor driver 4 so as to feed the film F at the predetermined speed V.

The pulse generator 9 includes a pulse plate 91 rotatable together with a rotatable shaft of the feed roller 2, and a photoreflector 92 (see FIG. 1), and generates a pulse train signal including a specified number of pulses corresponding to the number of rotation of the feed roller 2.

The controller 8 includes a film feed speed detector 81, a motor controller 82, an analog-to-digital (A/D) converter 83, a sampling clock generator 84 (indicated by SCK generator in FIG. 4), a block length setting portion 85, a block unit signal judger 86, and an unexposed frame detector 87.

The film feed speed detector 81 detects the feed speed V of the film F from the pulse train signal input from the pulse generator 9. Specifically, the detector 81 detects a pulse width τ (sec.) of the pulse train signal, and calculates the feed speed V based on the pulse width τ and a pulse number Np per rotation of the feed roller 2. If the film F is fed by S (mm) when the feed roller 2 makes a turn, the feed speed V is calculated to be S/(τ×Np).

The motor controller 82 controllably drives the motor driver 4 and the feed motor 3.

The A/D converter 83 converts an analog signal Sp input from the magnetic signal processor 6 into a digital signal. In this embodiment, the A/D converter 83 converts an analog signal of 0 to 5 V into a digital data of 8-bit. Specifically, it samples the pick-up signal Sp in a specified cycle in accordance with a sampling clock SCK input from the sampling clock generator 84, and converts an analog level value of each sampling signal into a digital value.

The sampling clock generator 84 generates the sampling clock SCK used in the A/D converter 82 as described above. In this embodiment, there is generated a sampling clock SCK having a sampling cycle of 40 μs. The sampling clock generator 84 corresponds to a time measurement means according to the invention, and the magnetic recording portion Fc is divided into a plurality of blocks in accordance with the sampling clock SCK.

The block length setting portion 85 divides the magnetic recording portion Fc into the plurality of blocks, and constitutes a divider according to the invention.

Figure 5:
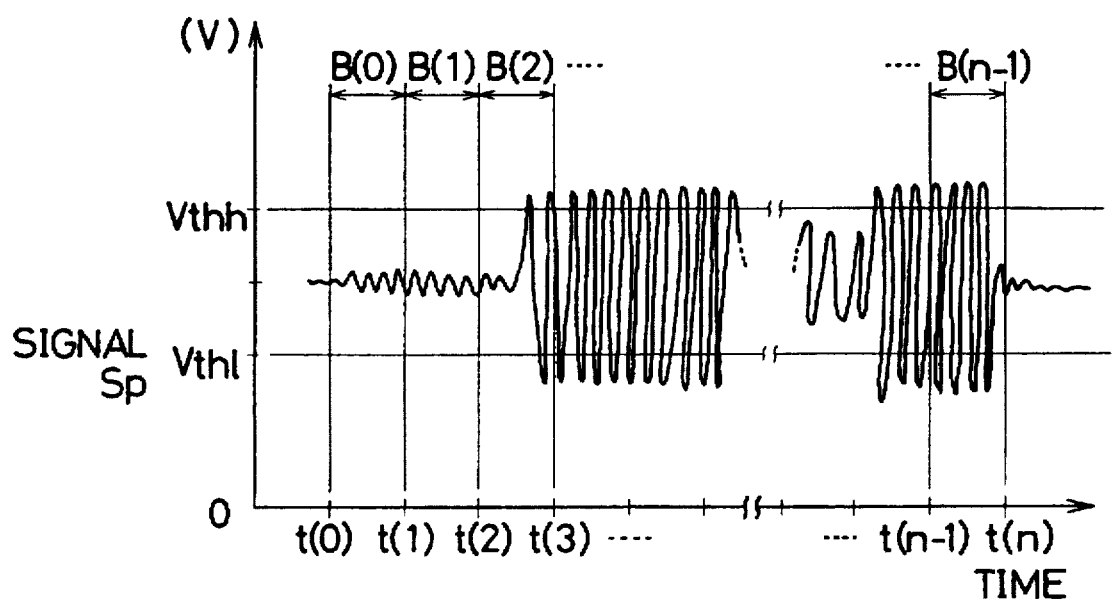
FIG. 5 is a chart showing division of the magnetic recording portion into a plurality of blocks based on a scanning period.

FIG. 5 is a waveform chart of the detection signal Sp output from the magnetic signal processor 6. If a scanning period for the magnetic recording portion Fc is supposed to be a period determined by t(0) and t(n), the block length setting portion 85 divides the magnetic recording portion Fc into a plurality of blocks B(0), B(1), B(2), . . . B(n-1) by dividing the scanning period t(0) to t(n) by n, and sets lengths of the respective blocks B(0), B(1), B(2), . . . B(n-1) at t(0)-t(1), t(1)-t(2), . . . . . t(n-1)-t(n) in accordance with the sampling clock signal SCK.

In this embodiment, the magnetic recording portion is divided such that the size of each block B(i) (i=0, 1, 2, . . . n-1) corresponds to 90 sampling pulses. The block length setting portion 85 divides the magnetic recording portion Fc by an area length unit: a scanning time of 3.6 ms (=40 μs×90). Accordingly, in the case that the film F is fed, for example, at a speed of 50 mm/s, the scanning period Ts for the entire magnetic recording portion Fc is 0.44 seconds (=22 mm/50 mm/s). Thus, the magnetic recording portion Fc is divided into about 122 blocks.

The length of each block B(i) is set at 3.6 ms for the following reason. Since a maximum cycle tmax of the Ix-signal is 1.8 ms (=1/fmin=1/563.6), if the block length of each block B(i) is set longer than the maximum cycle tmax of the Ix-signal, a peak of the Ix-signal can be securely detected in any of the blocks B(i). Accordingly, the length of the blocks B(i) is not limited to 3.6 ms, but may be set at a desired length longer than the maximum cycle tmax of the Ix-signal.

The block unit signal judger 86 judges whether the Ix-signal is included in the respective blocks B(i) in accordance with a level value of a sampling data Ds (the A/D converted data of the signal Sp). The judger 86 includes a level detector 861 and a data number counter 862. The level detector 861 picks up the sampling data Ds corresponding to the Ix-signal from each block B(i), and the data number counter 862 counts the number of the picked up sampling data Ds, and judges based on the count result whether or not the Ix-signal is included in each block B(i).

The level detector 861 picks up the sampling data Ds outside a range of, e.g. 2.5±0.1 V (where 2.5 V is a bias level) as the Ix-signal. A/D converted values of upper and lower limits 2.6 V and 2.4 V of the above range are set as threshold levels Vthh (=133 (=255×2.6/5.0)), Vthl (=123 (=255×2.4/5.0) in advance. The threshold levels 2.6 V and 2.4 V are merely an example of settable values. Suitable values can be set in accordance with the characteristics of the A/D converter, and a recording level of the Ix-signal.

The level detector 861 compares the respective sampling data Ds with the threshold levels Vthl, Vthh, and detects the sampling data Ds as the level of the Ix-signal if Ds≦Vthl or Vthh≦Ds while detecting it as the level of the signal other than the Ix-signal if Vthl <Ds<Vthh.

The data number counter 862 determines that the block B(i) includes the Ix-signal if a number N of the sampling data Ds detected as the level of the Ix-signal is a predetermined number Nr or larger, while determining, that the block B(i) does not includes the Ix-signal if the number N is smaller than the predetermined number Nr. The predetermined number Nr is a threshold value used to judge whether the signal in the block B(i) is the Ix-signal. In this embodiment, Nr is set at 17 because of Ix-signal detection conditions to be described below.

In this embodiment, the signal Sp input from the magnetic signal processor 6 to the A/D converter 83 is adjusted at, e.g. 400 mVp-p. A range of valid signal levels, i.e. a difference between the two threshold levels Vthh, Vthl is set at 196 mVp-p as shown in FIG. 6 so that, even in the case that the level of the signal Sp is lowered to a lowest level 60% (240 mVp-p) due to a dropout or an azimuth error of the head 5, the pick-up signal can be detected as the Ix-signal.

The range of 196 mVp-p corresponds to 0.2 V of the pick-up range of 2.5±0.1V. After being converted in the A/D converter 83, the upper and lower limits of the pick-up range become the upper threshold level Vthh of 133 and the lower threshold level Vthl of 123, respectively.

Figure 6:
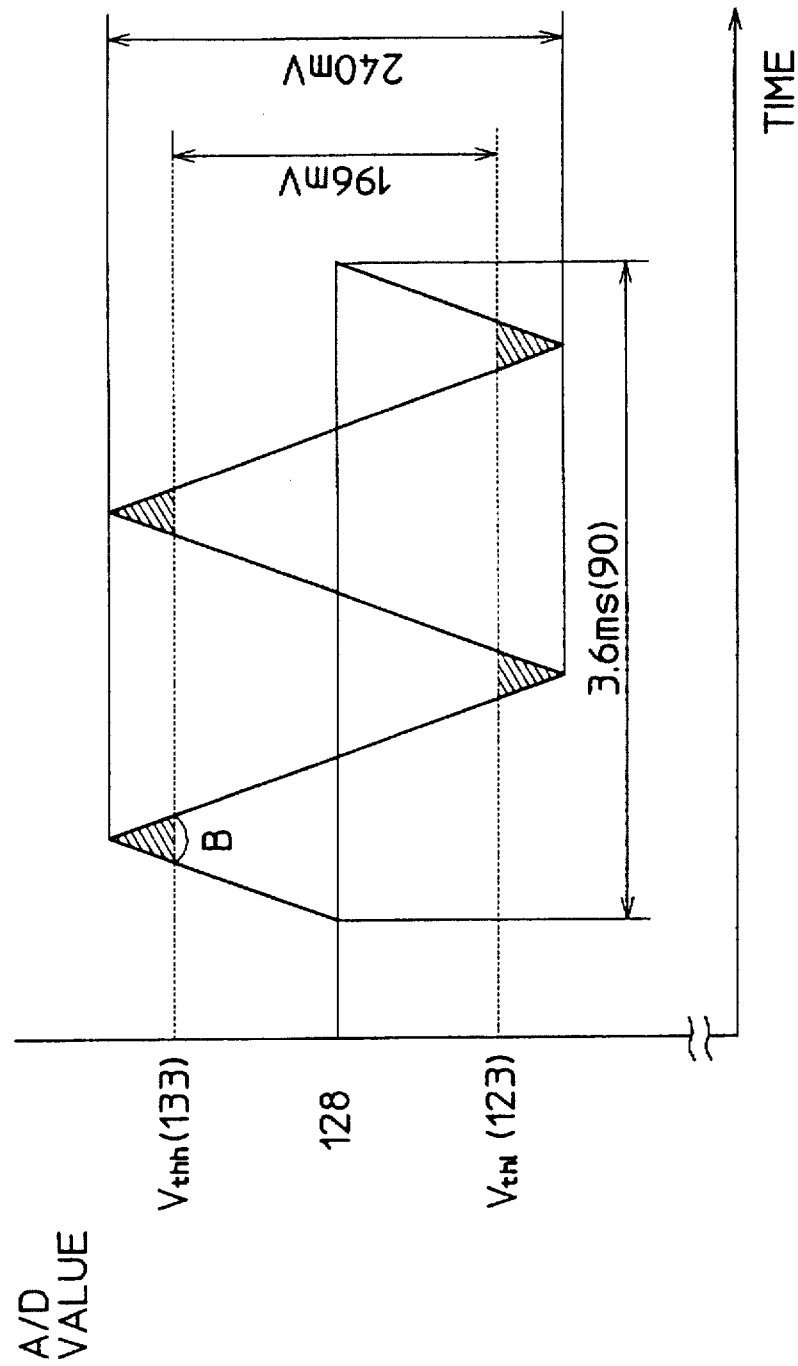
FIG. 6 is a chart showing a threshold value Nr of a sampling data number used to judge the block.

If the waveform of the pick-up signal Sp is simplified to approximate to a triangular wave, portions thereof located outside the range defined between Vthl and Vthh in the A/D converted values of the A/D converter 83 are indicated by hatching in FIG. 6. The number of sampling data included in these hatched portions serves as the threshold value Nr.

In FIG. 6, if the number of sampling data forming a bottom side B of one hatched triangle portion is N, the threshold value Nr is 4N. Since the sampling data number N=(90/4)×(240−196)/240, the threshold value Nr is calculated to be 90×(240−196)/240. Thus, Nr=16.5=17.

The threshold value Nr is also an example of a settable value, and can be set at a desired value in accordance with the recording level of the Ix-signal and the length of the block B(i).

The unexposed frame detector 87 judges based on the presence or absence of the Ix-signal in each block B(i) whether the frame corresponding to the magnetic recording portion Fc is enexposed. For example, the frame is judged to be exposed if there are a predetermined number Nb of consecutive blocks detected to include the Ix-signal.

The predetermined number Nb is set in accordance with a burst-shaped noise generation period. For example, if a maximum burst-shaped noise generation period is k blocks, the number Nb is set at least at (k+2) since the maximum number of consecutive blocks detected to include the Ix-signal of the signal Sp including the burst-shaped noise is (k+1). By setting the number Nb as above, even if the signal Sp including the burst-shaped noise is detected, it is not erroneously detected to be the Ix-signal. Thus, the unexposed frames can be accurately judged.

The number Nb used for the unexposed frame judgment is also an example of a settable value, and can be set at a desired value in accordance with the length of each block B(i) and the burst-shaped noise generation period.

Figure 7:
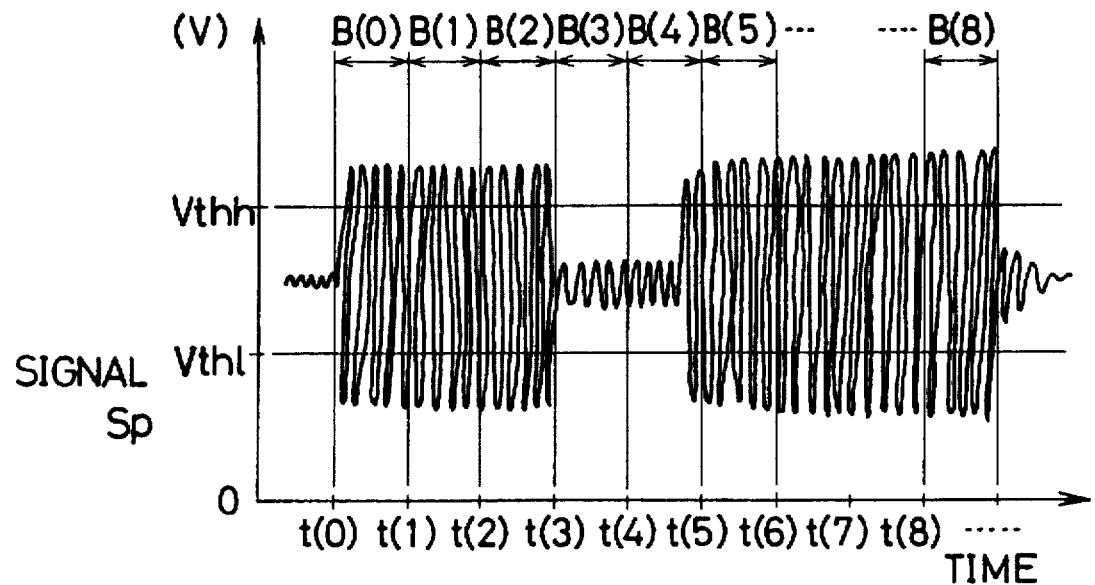
FIG. 7 is a chart showing an exemplary signal Sp which is judged to represent an exposed frame.

In this embodiment, Nb=3. In other words, if there are three consecutive blocks B(i) detected to include the Ix-signal, the frame is judged to be an exposed frame. Accordingly, when the signal Sp output from the magnetic signal processor 6 is such as shown in FIG. 7, it is judged to be the Ix-signal since there are three or more consecutive blocks B(0) to B(2), B(5) to B(8) detected to include the Ix-signal although the blocks B(3), B(4) are detected not to include the Ix-signal (missing of the Ix-signal). Thus, the frame Fa corresponding to the detected magnetic recording portion Fc is judged to be an exposed frame.

Figure 8:
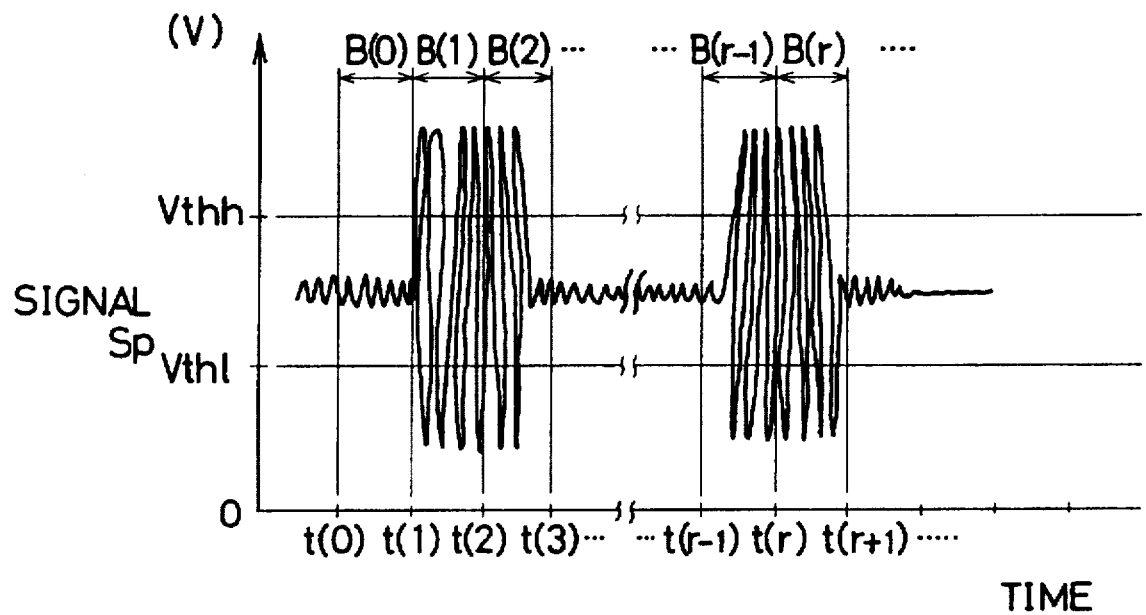
FIG. 8 is a chart showing an exemplary signal Sp which is judged to represent an unexposed frame.

On the other hand, if the signal Sp output from the magnetic signal processor 6 is such as shown in FIG. 8, the signal portions in the blocks B(1), B(2) and B(r-1), B(r) are judged to be burst-shaped noises since there are no three consecutive blocks detected to include the Ix-signal although the blocks B(1), B(2), B(r-1), B(r) are detected to include the Ix-signal. Thus, the frame Fa corresponding to the magnetic recording portion Fc is judged to be unexposed.

Figure 9:
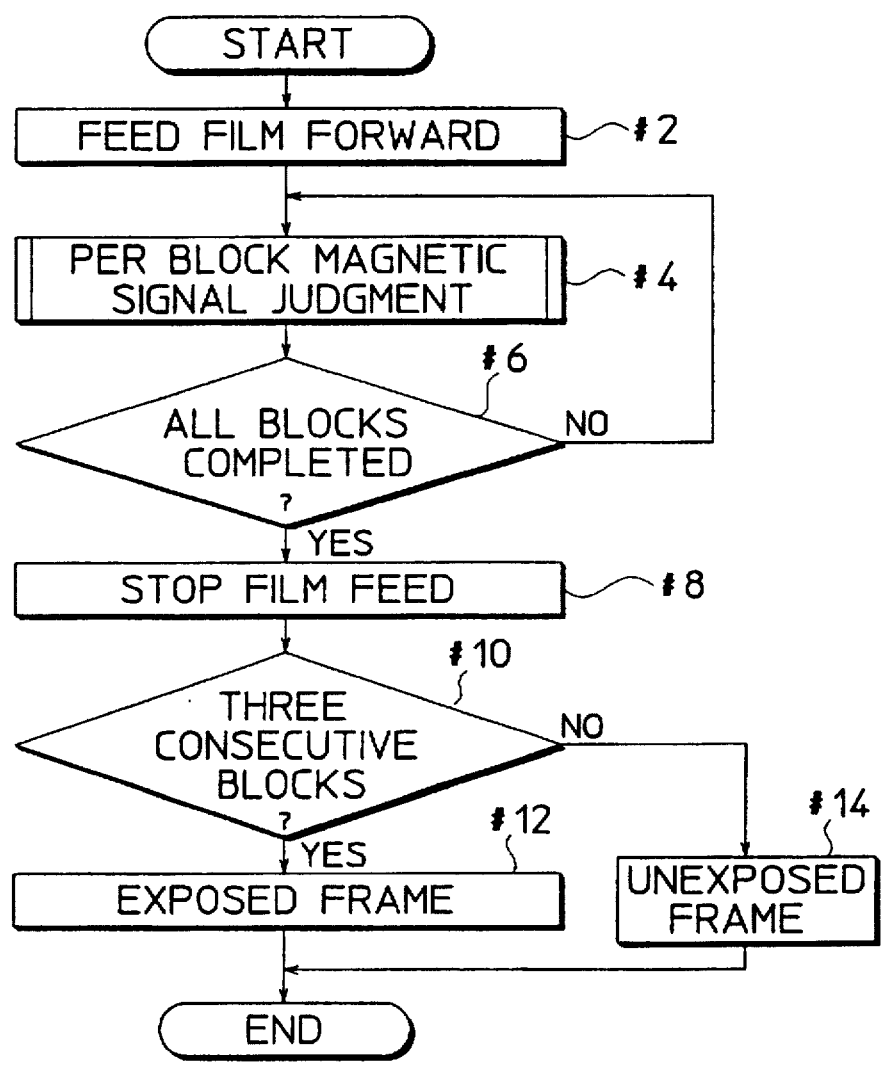
FIG. 9 is a main flowchart of an unexposed frame judgment processing in the first control system.
Figure 10:
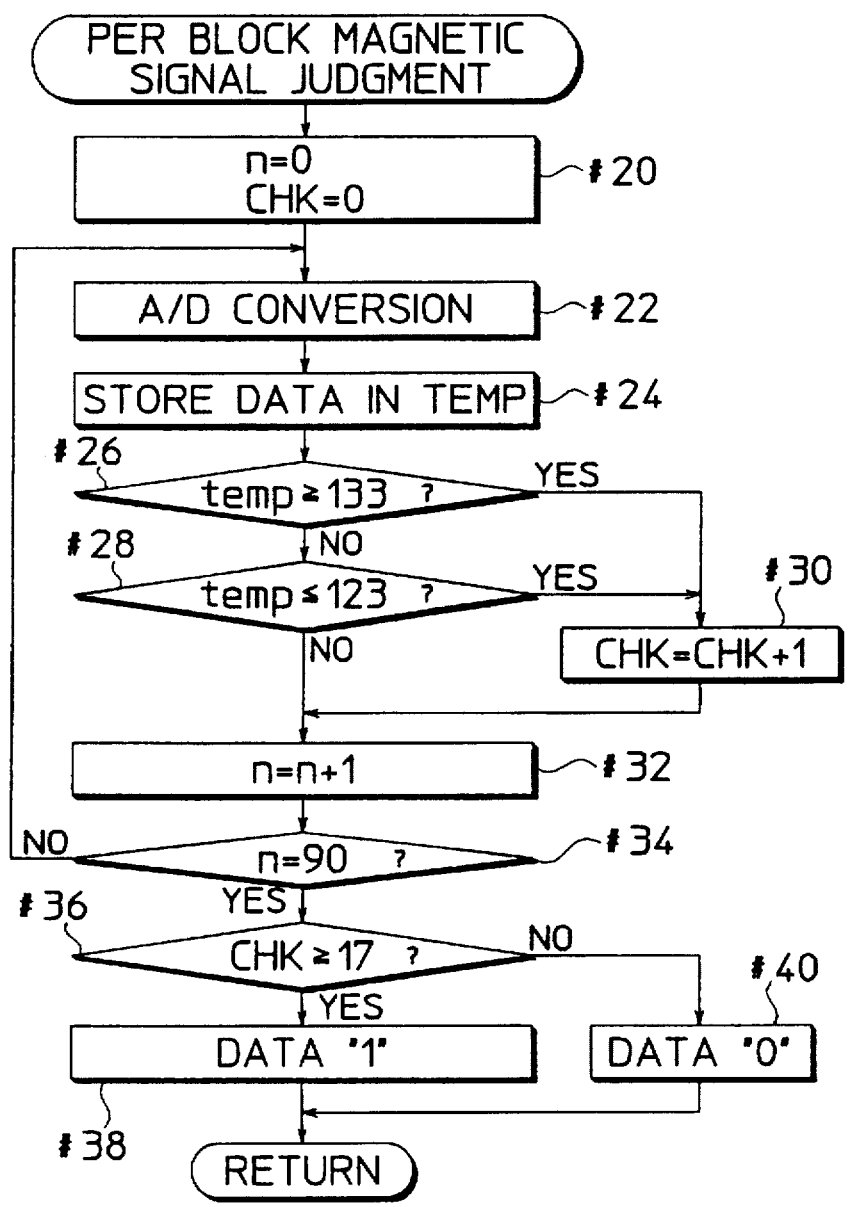
FIG. 10 is a flowchart showing a subroutine "Per Block Magnetic Signal Judgment" of the unexposed frame judgment processing.

FIG. 9 is a main flowchart of an unexposed frame judgment processing, and FIG. 10 is a flowchart showing a subroutine "Per Block Magnetic Signal Judgment".

First, the feed motor 3 is driven at a specified speed in the forward direction so as to feed the film F in the winding direction (Step #2). Subsequently, in accordance with the subroutine "Per Block Magnetic Signal Judgment", the block unit signal judger 86 makes a judgment for the first block B(0) as to whether the signal Sp output from the magnetic signal processor 6 includes the Ix-signal (a loop of Steps #4 and #6).

In the subroutine "Per Block Magnetic Signal Judgment" (see FIG. 10), a counter for counting the sampling number n and a counter for counting a number CHK of the sampling data Ds detected to include the level of the Ix-signal are initialized at "0", respectively (Step #20).

Subsequently, the output signal Sp of the magnetic signal processor 6 is sampled in synchronism with the sampling clock SCK by the A/D converter 83, and the sampling data Ds is generated by A/D converting the level of the signal Sp into a digital data (Step #22). The thus obtained sampling data Ds is stored in a register temp (Step #24).

Thereafter, the sampling data Ds in the register temp is compared with the threshold levels Vthh (=133) and Vthl (=123) (Steps #26, #28). If Vthl (=123)<temp (Ds)<Vthh (=133) (NO in Steps #26, #28), the sampling number counter is incremented by 1 (Step 32). If temp (Ds)≦Vthl (=123) or Vthh (=133)≦temp (Ds) (YES in Steps #25, #28), the data number counter is incremented by 1 (Step 30) and then the sampling number counter is incremented by 1 (Step #32).

It is then judged whether the sampling number n has reached 90 corresponding to the length of one block (Step #34). If the sampling number n is smaller than 90 (NO in Step #34), this subroutine returns to Step #22 and the above judgment is conducted for the next sampling data Ds (Steps #22 to #34).

When the sampling number n reaches 90 (YES in Step #34), it is judged whether the data number CHK of the Ix-signal is equal to or greater than the predetermined threshold value Nr (=17) (Step #36). If CHK≦Nr (YES in Step #36), a data "1" representing that the block includes the Ix-signal is output to the block B(0) (Step #38). If CHK<Nr (NO in Step #36), a data "0" representing that the block does not include the Ix-signal is output to the block B(0) (Step #40). Then, this subroutine returns.

Hereafter, the magnetic signal judgment is conducted for all the blocks B(0) to B(n-1) constituting the magnetic recording portion Fc. Upon completion of the judgment for all the blocks (YES in Step #6), the feed of the film F is stopped (Step #8). Subsequently, it is judged whether there are three consecutive blocks B(i) having detected to include the Ix-signal by the unexposed frame detector 87 (Step #10). If there are such blocks (YES in Step #10), a signal representing that the corresponding frame is an exposed frame is output to, e.g., the camera controller (Step #12). If the judgment result in Step #10 is in the negative, a signal representing that the corresponding frame is an unexposed frame is output to the camera controller (Step #14). Then, the unexposed frame judgment ends.

Figure 11:
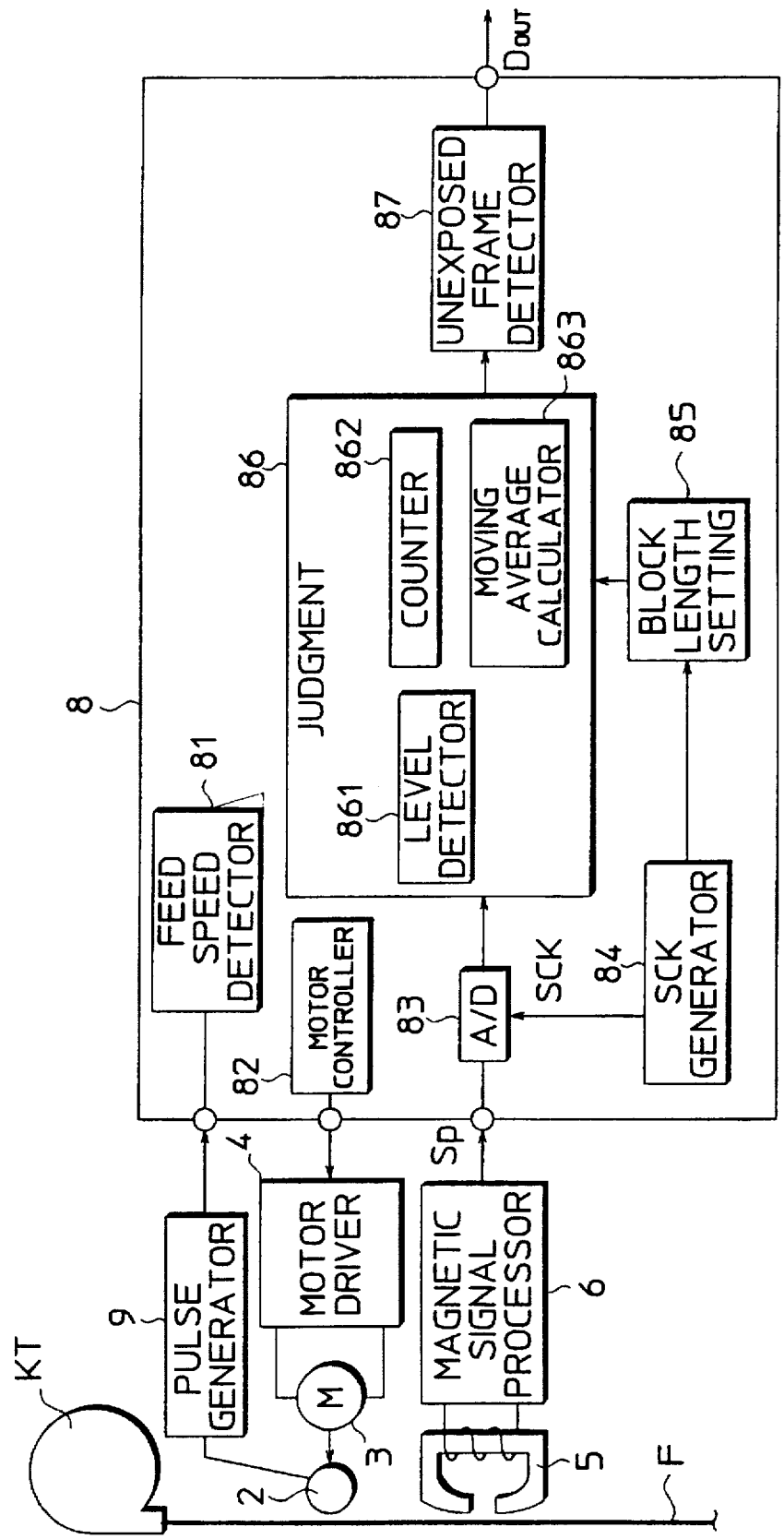
FIG. 11 is a block diagram of a second control system of the judging device.

FIG. 11 is a second control system of the unexposed frame judging device. FIG. 11 differs from FIG. 4 in that a block data moving average calculating circuit 863 is provided in the block unit signal judger 86.

In the first control system, the output signal Sp of the magnetic signal processor 6 is divided into a plurality of blocks B(i), and whether the frame is unexposed is judged by judging for each block B(i) whether the Ix-signal is included and whether there are three consecutive blocks B(i)

detected to include the Ix-signal. In the second control system, a moving average processing having a characteristic of a low-pass filter is applied to the results of the judgment as to whether the respective blocks include the Ix-signal, and whether the frame is unexposed is judged based on the processing result.

The results of the judgment as to whether the respective blocks B(i) include the Ix-signal are in the form of a data train signal Db consisting of binary data "1" or "0" representing the judgment results for the respective blocks B(0), B(1), B(2), . . . B(n-1). If the output signal Sp of the magnetic signal processor 6 is the Ix-signal, the data train sional Db is considered to be a signal in which the consecutive data "0" which discretely last for a short period are included in the consecutive data "1" which last for a relatively long period. If the output signal Sp is a signal including a burst-shaped noise, the data train signal Db is considered to be a signal in which the consecutive data "1" which last for a short period are discretely included in the consecutive data "0" which last for a relatively long period.

The longer the same digit lasts and the less frequently the digits changes, the more low frequency components the data train signal consisting of binary data has. On the contrary, the shorter the same digit lasts and the more frequently the digits change, the more high frequency components the data train signal has. A moving average processing is applied to the data train signal Db as follows. In the case that the consecutive data "0" which discretely last for a short period are included in the consecutive data "1" which last for a relatively long period, the high frequency components of the data train signal Db are removed by converting the consecutive data "0" which last for a specified short period into the data "1".

The moving average processing is performed in the following manner. From the data train signal d(0), d(1), d(2), . . . d(n), there are extracted m consecutive data d(i), d(i+1), . . . d(i+m-1) (i=0, 1, 2, . . . n-m). The leading data d(i) of the extracted consecutive data is changed to "1" if the number of the data "1" in the extracted data is a predetermined number p ($\leq$m) or larger. The leading data d(i) is changed to "0" if the number of the data "1" in the extracted data is smaller than p.

The above data change can be performed only up to the data d(n-m) out of all the data d(0), d(1), d(2), . . . d(n-1) constituting the data train signal. Accordingly, the number of data included in the data train signal after the moving average processing is (n-m+1).

The number m of the consecutive data d(i), the number p of the extracted data, and the number of the moving average processing are not limited to the values as mentioned above. These values are suitably set according to the recording level of the Ix-signal, the noise level, etc.

An example where the block number n=17 is described. It is assumed that a0, a1, a2, . . . a16 denote the binary data of the blocks B(0), B(1), B(2), . . . B(16), and Db(a0, a1, a2, . . . a16) denotes the data train signal Db. It is further assumed that, under the condition that m=5, p=3, Dbih1(b0, b1, b2, . . . , b12) denotes a data train signal obtained by applying the moving average processing to the data train signal Db, and Dbih2(c0, c1, c2, . . . , c7) denotes a data train sional obtained by applying the moving average processing to a data train signal Dbih. Then, in the case of the signal Sp including the Ix-signal, the data train signals Db, Dbih1, Dbih2 are, for example, as shown in FIG. 12. In the case of the signal Sp not including the Ix-signal, the data train signals Db, Dbih1, Dbih2 are, for example, as shown in FIG. 13.

As shown in FIGS. 12 and 13, if the moving average processing is applied to the data train signal Db twice, the data train signal Dbih2 consists entirely of the data "1" if the signal Sp includes the Ix-signal. On the other hand, if the signal Sp does not include the Ix-signal, the signal Dbih2 consists entirely of the data "0" Accordingly, whether the signal Sp includes the Ix-signal can be easily and accurately judged from the data train signal Dbih2 obtained by applying the moving average processing to the data train signal Db twice.

An unexposed frame judgment processing in the second control system is described with reference to flowcharts shown in FIGS. 14 to 16.

Figure 14:
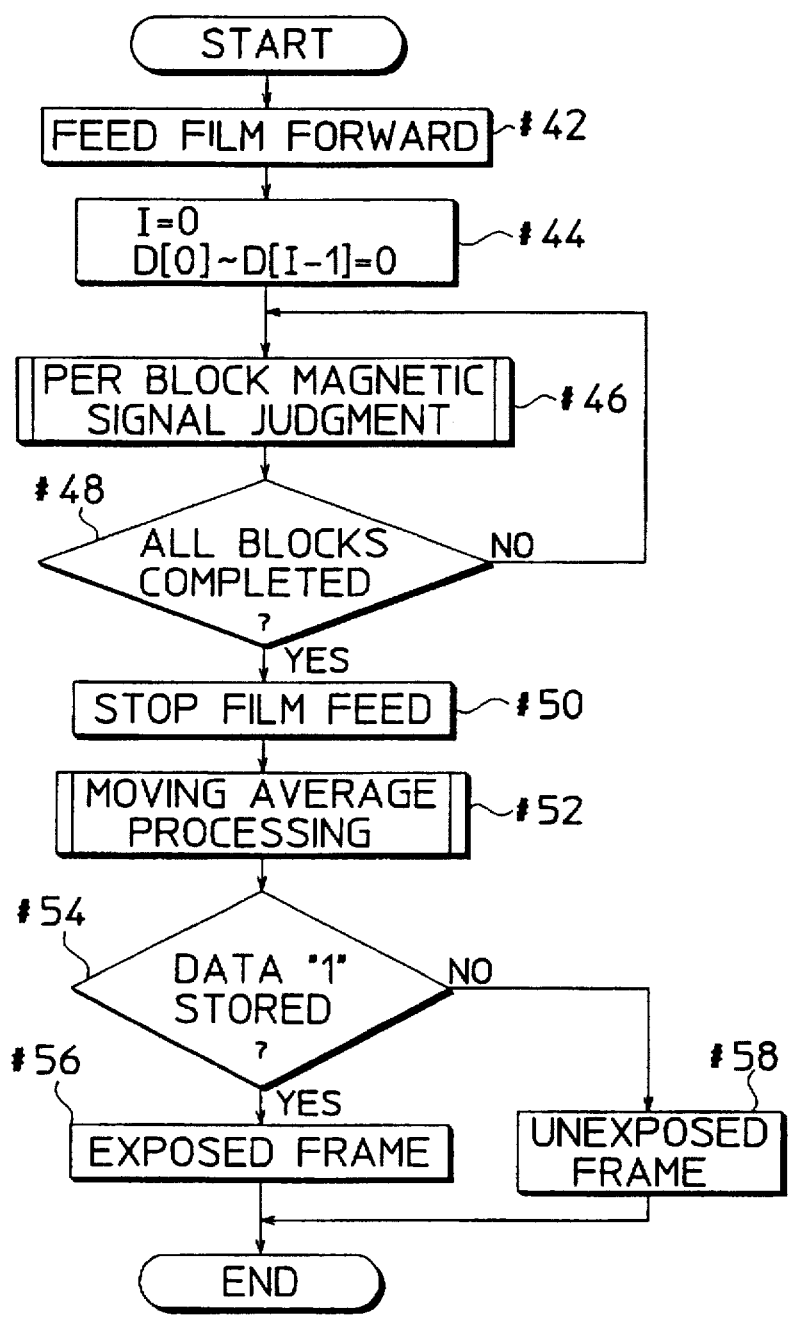
FIG. 14 is a main flowchart of an unexposed frame judgment processing in the second control system.
Figure 15:
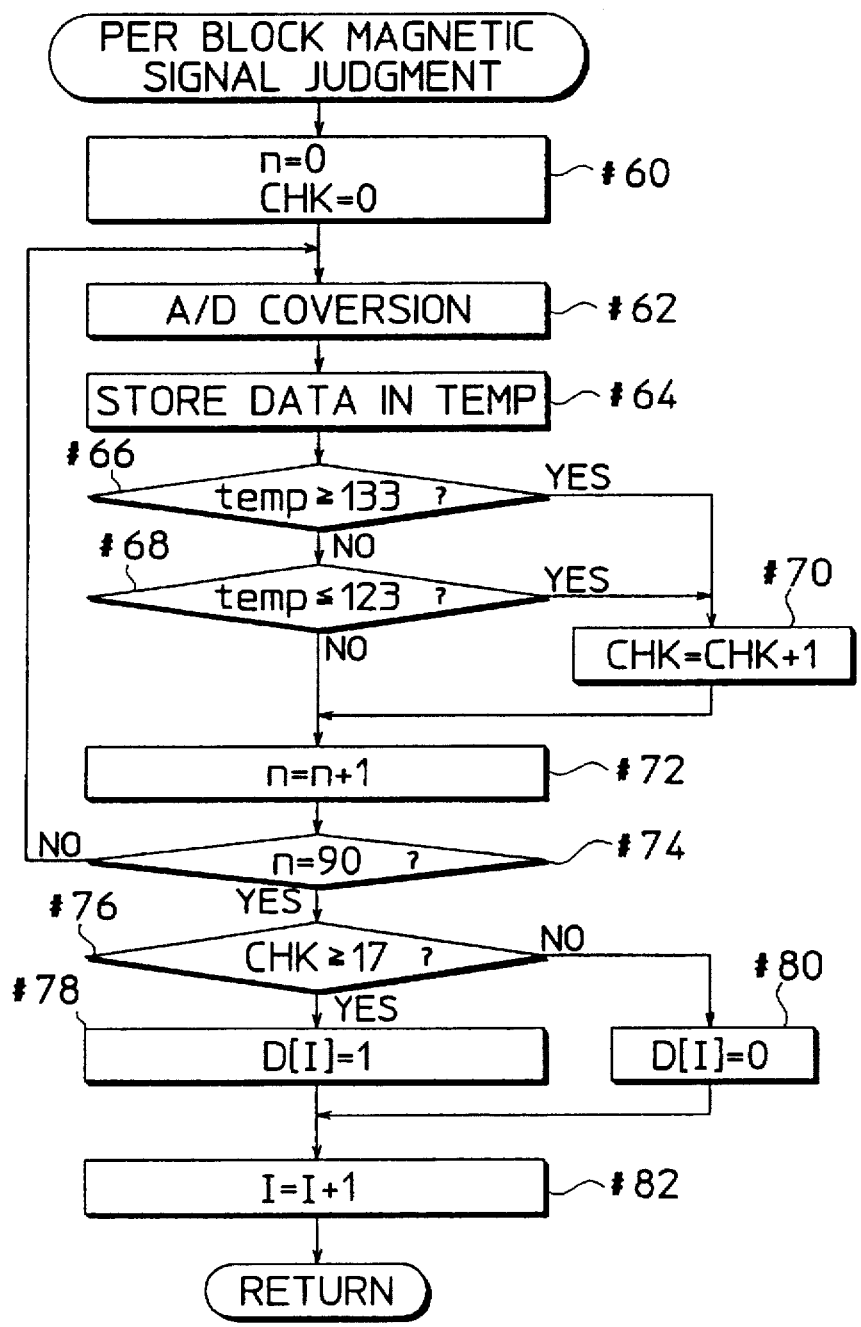
FIG. 15 is a flowchart showing a subroutine "Per Block Magnetic Signal Judgment" of the unexposed frame judgment processing in the second control system.
Figure 16:
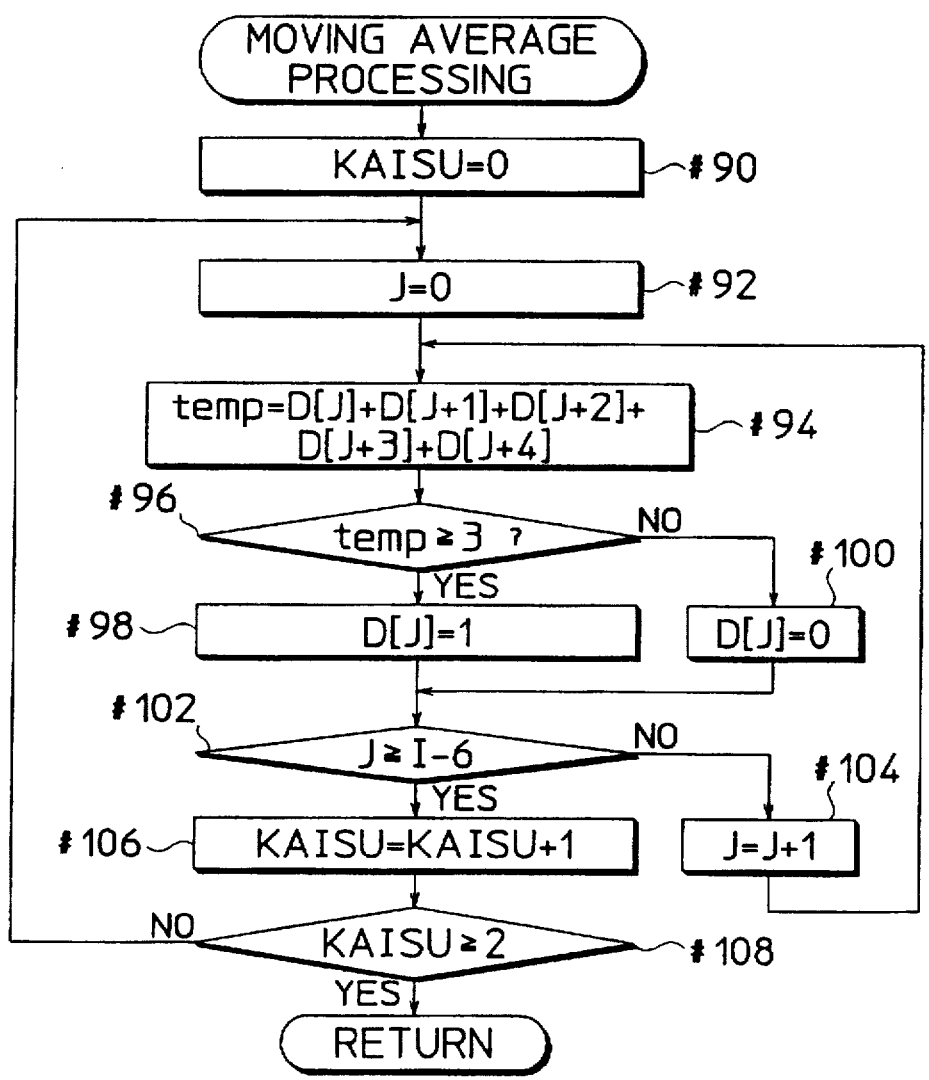
FIG. 16 is a flowchart showing a subroutine "Moving Average Processing" of the unexposed frame judgment processing in the second control system.

FIG. 14 is a main flowchart of an unexposed frame judgment processing in the second control system, FIG. 15 is a flowchart showing a subroutine "Per Block Magnetic Signal Judgment" of the unexposed frame judgment processing in the second control system, and FIG. 16 is a flowchart showing a subroutine "Moving Average Processing" of the unexposed frame judgment processing in the second control system.

First, the feed of the film F in the winding direction is started by driving the feed motor 3 at a specified speed in the forward direction (Step #42). A counter I for counting the number of blocks B(i) and the memory D[I] (I '0, 1, 2, . . . ) for storing the binary data indicative of the presence or absence of the Ix-signal in the respective blocks B(i) are initialized (Step #44).

Subsequently, according to the subroutine "Per Block Magnetic Signal Judgment", the block unit signal judger 86 judges, for the first block B(0), whether the output signal Sp of the magnetic signal processor 6 includes the Ix-signal (a loop of Steps #46, #48).

In the subroutine "Per Block Magnetic Signal Judgment" (see FIG. 15), the same processing performed in a loop of Steps #20, #22 to #34 of the subroutine "Per Block Magnetic Signal Judgment" shown in FIG. 10 is performed in a loop of Steps #60, #62 to #74. More specifically, whether the respective sampling data Ds in the block B(0) are of the level of the Ix-signal is judged, and the number CHK of the sampling data Ds having the level of the Ix-signal is counted.

Upon completion of the counting of the data number CHK (YES in Step #74), it is judged whether the data number CHK is greater than or equal to the threshold value Nr (=17) (Step #76). If CHK$\geq$Nr (=17) (YES in Step #76), the data "1" corresponding to the judgment result is stored in the memory D[0] for the block B(0) (Step #78). If CHK<Nr (=17) (NO in Step #76), the data "0" corresponding to the judgment result is stored in the memory D|0|(Step #78), and this subroutine returns.

Referring back to FIG. 14, upon completion of the magnetic signal judgment for the block B(0), it is judged whether the magnetic signal judgment has been performed for all the blocks of the magnetic recording portion Fc (Step #48). This routine returns to Step #46 since, at this stage, the magnetic signal judgment has not yet been performed for all the blocks (NO in Step #48), and the magnetic signal judgment is performed for the next block B(1).

Upon completion of the magnetic signal judgment for all the blocks B(0) to B(n-1) constituting the magnetic recording portion Fc (YES in Step #48), the feed of the film F is stopped (Step #50). Subsequently, the moving average processing is applied to the data train signal Db stored in the memories D[0] to D[I-1] in accordance with the subroutine "Moving Average Processing".

In the subroutine "Moving Average Processing" (see FIG. 16), a counter KAISU for counting the number of the moving average processing performed and a counter J for counting the number of the data to which the moving average processing is applied are initialized at "0", respectively (Steps #90, #92).

Subsequently, an addition result of five binary data stored in the memories D[0] to D[4] (corresponding to J=0 to J-4) is stored in the register temp (Step #94). It is then judged whether the addition result temp is 3 or larger (Step #96). Since m=5, p=3 in this embodiment, five consecutive data are added in Step #94 and the addition result temp is compared with a numerical value "3".

If temp≧3 (YES in Step #96), the data "1" is stored in the memory D[0] (Step #98). On the other hand, if temp<3 (NO in Step #96), the data "0" is stored in the memory D[0] (Step #100).

It is then judged whether the count value of the counter J is larger than or equal to I-5 (where I denotes the number of the blocks) (Step #102). Since this is the first processing, J≦I-5 (NO in Step 102). Accordingly, the count value of the counter J is incremented only by 1 (Step #104), and this subroutine returns to Step #94 in which the moving average processing is applied to a next set of five consecutive binary data which are stored in the memories D[1] to D[5] (corresponding to J=1 to J=5) and shifted from the former set of data by one data (Steps #94 to #102).

Hereafter, the moving average processing is applied to the respective sets of five consecutive data corresponding to J=2 to J=6, J=3 to J=7, . . . , J=I-5 to J=I-1 which are sequentially shifted by one data (a loop of Steps #94 to #102). Upon completion of the moving average processing for the next set of data corresponding to J=I-5 to J=I-1 (YES in Step #102), the count value of the counter KAISU is incremented by 1 only (Step #106).

Subsequently, it is judged whether the count value of the counter KAISU is larger than or equal to 2 (Step #108). If KAISU <2 (NO in Step #108), this subroutine returns to Step #92, and the moving average processing is applied to the data stored in the memories D[0] to D[I-1] for the second time. Upon completion of the second moving average processing (YES in Step #108), this subroutine returns. Since the moving average processing is performed twice in this embodiment, the count value of the counter KAISU is compared with a numerical value "2" in Step #108.

Subsequently, upon completion of the moving average processing, it is judged whether the data "1" is stored in any of the memories D[0] to D[I-6] (Step #54). If the data "1" is stored (YES in Step #54), a signal representing that the judged frame is an exposed frame is output, for example, to the camera controller (Step #56). If the data "1" is not stored (NO in Step #54), a signal representing that the judged frame is an unexposed frame is output to the camera controller (Step #58). Then, the unexposed frame judgment ends.

Figure 17:
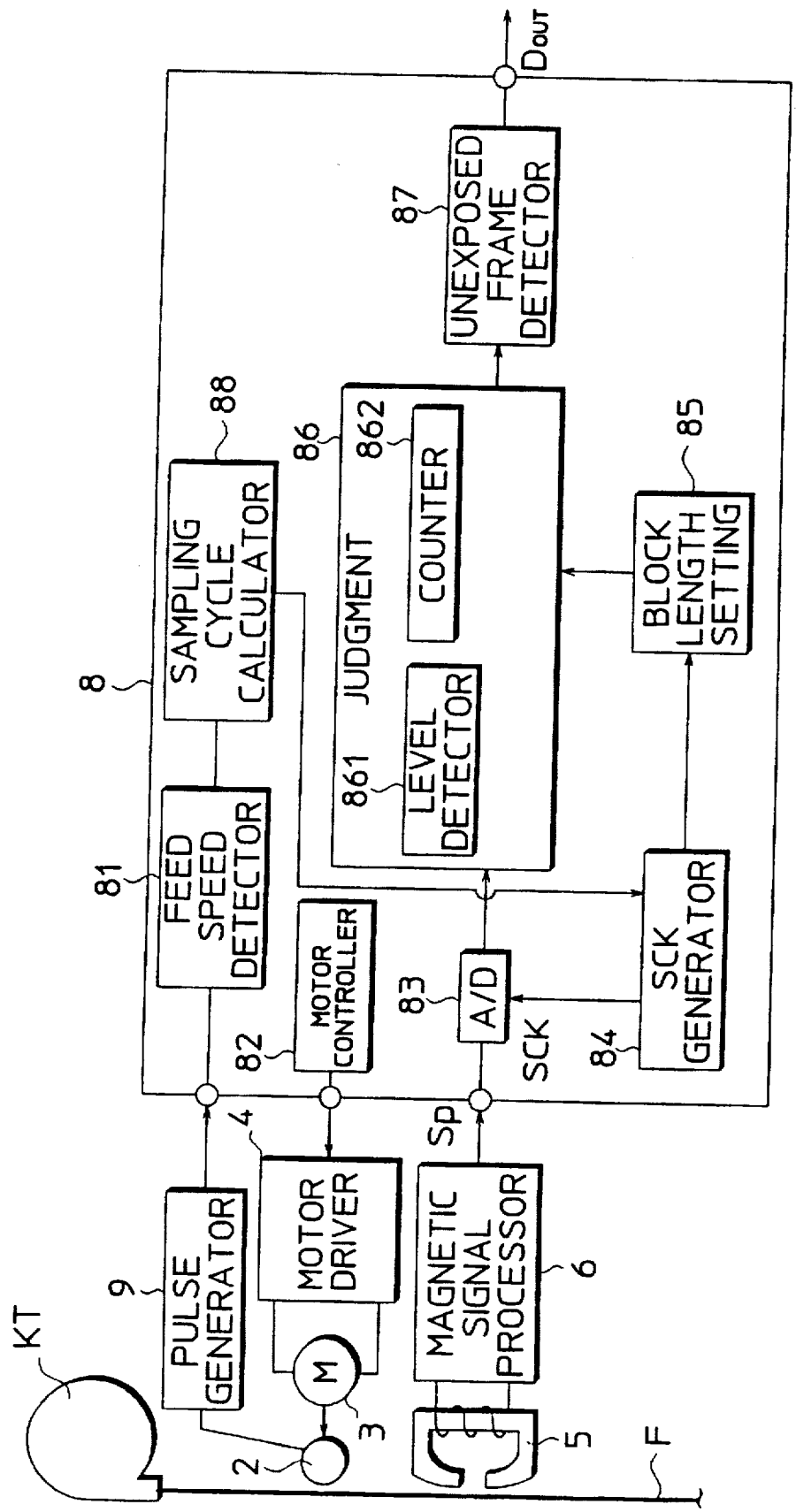
FIG. 17 is a block diagram of a third control system of the judging device.

FIG. 17 is a block diagram of a third control system of the unexposed frame judging device.

FIG. 17 differs from FIG. 1 in that a sampling cycle calculator 88 is added. In the first and second control systems, the length of the respective blocks D(i) is set based on the predetermined scanning time (sampling cycle (40 μs)×the number of sampling data (90)). In the third control system, the sampling cycle Ts in which the sampling data Ds are sampled is calculated from an actual film feed speed V, and the length of the respective blocks B(i) is set in accordance with the sampling cycle Ts.

Specifically, as opposed to the first and second control systems in which the magnetic recording portion Fc is divided into a plurality of blocks B(i) in accordance with the predetermined scanning period, the magnetic recording portion Fc is divided into a plurality of blocks B(i) in accordance with a scanning dimension based on a minimum frequency fmin in the third control system.

Since the scanning period is fixed in the first and second control systems, the magnetic recording portion can be easily divided in accordance with the sampling clock CHK, but the length of the respective blocks B(i) varies according to the feed speed V of the film F. Since the minimum frequency fmin varies according to the feed speed V of the film F in the third control system, although the scanning period of the respective blocks B(i) varies according to the feed speed V of the film F, the length of the respective blocks B(i) can be fixed independently of the feed speed V of the film F.

Next, an unexposed frame judgment in the third control system is described with reference to FIGS. 18 to 21.

Figure 18:
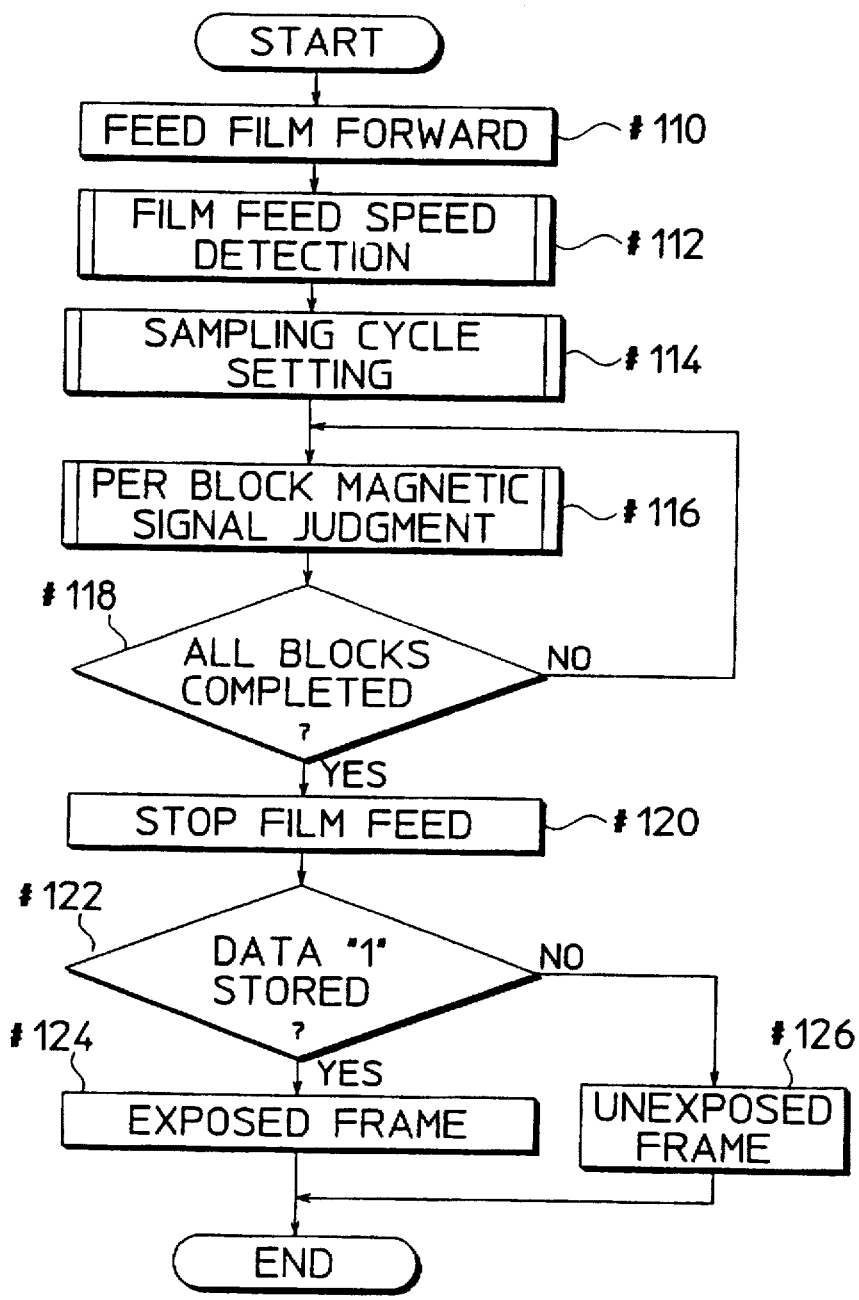
FIG. 18 is a main flowchart of an unexposed frame judgment processing in the third control system.
Figure 19:
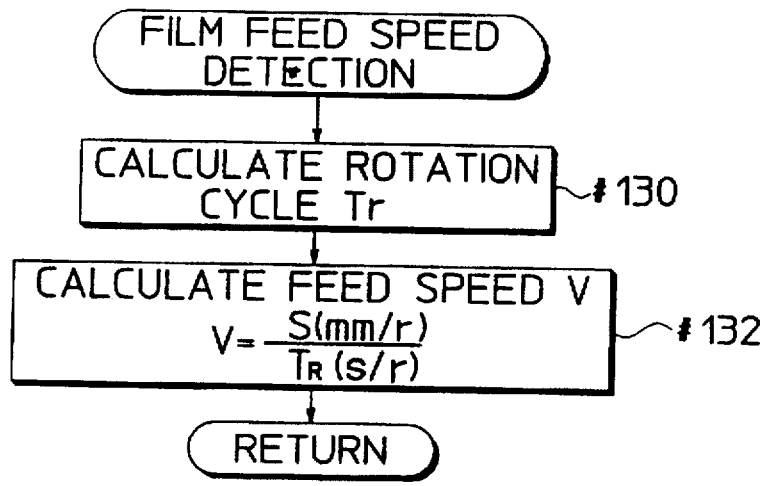
FIG. 19 is a flowchart showing a subroutine "Film Feed Speed Detection" of the unexposed frame judgment processing in the third control system.
Figure 20:
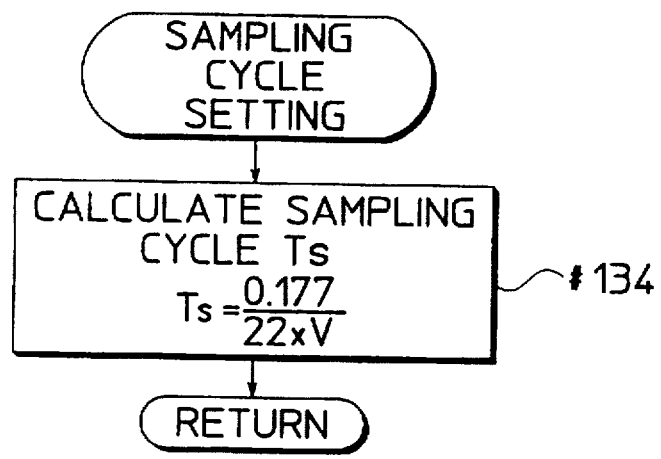
FIG. 20 is a flowchart showing a subroutine "Sampling Cycle Setting" of the unexposed frame judgment processing in the third control system.
Figure 21:
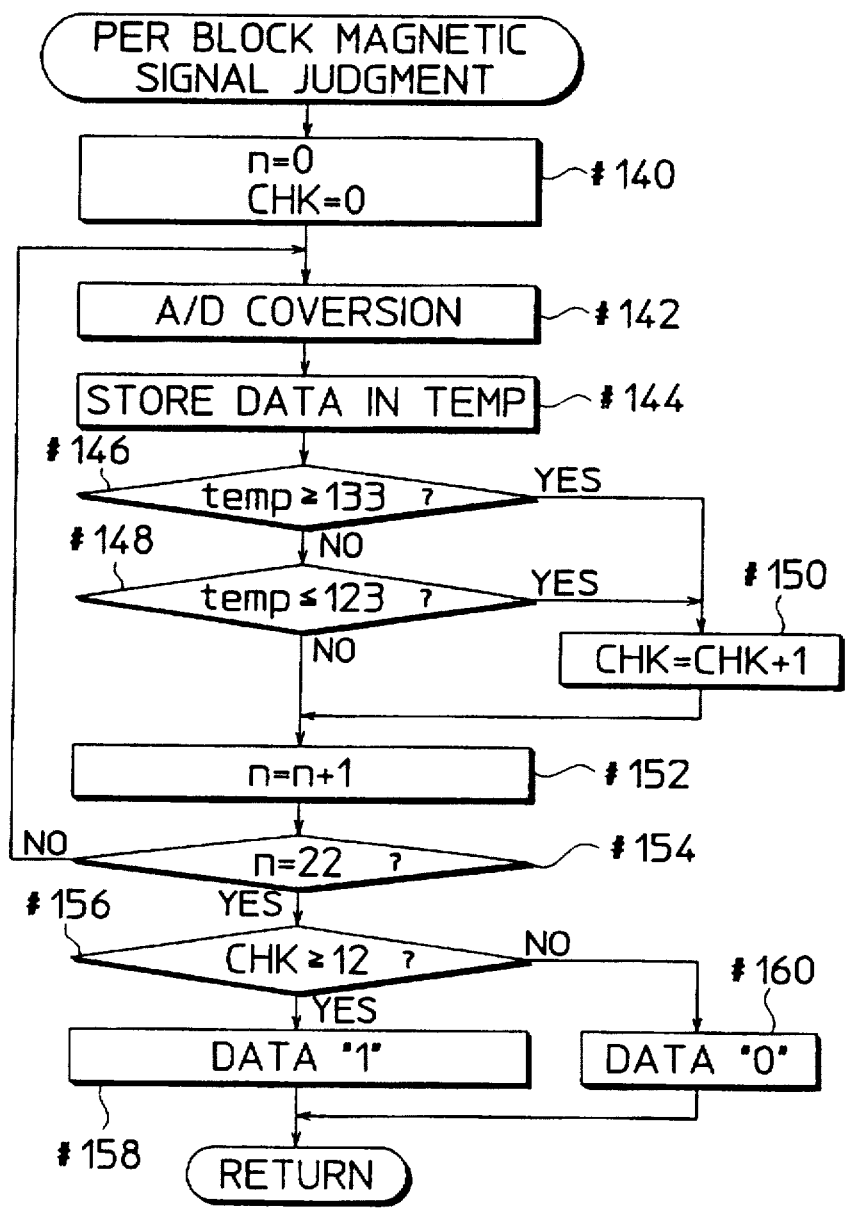
FIG. 21 is a flowchart showing a subroutine "Per Block Magnetic Signal Judgment" of the unexposed frame judgment processing in the third control system.
Figure 22:
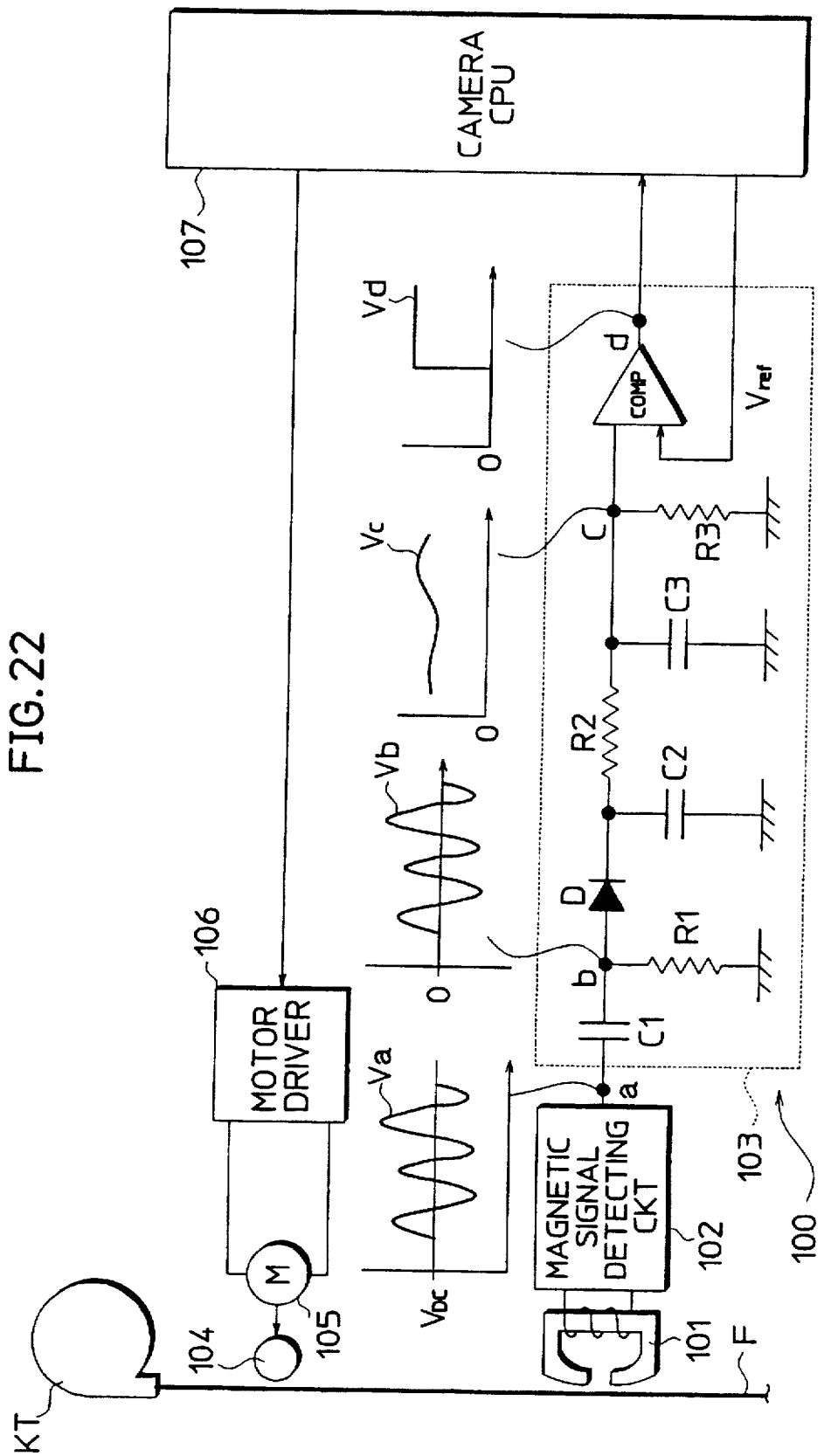
FIG. 22 is a circuit construction diagram of a magnetic signal judger in a prior art unexposed frame judging device.
Figure 23:
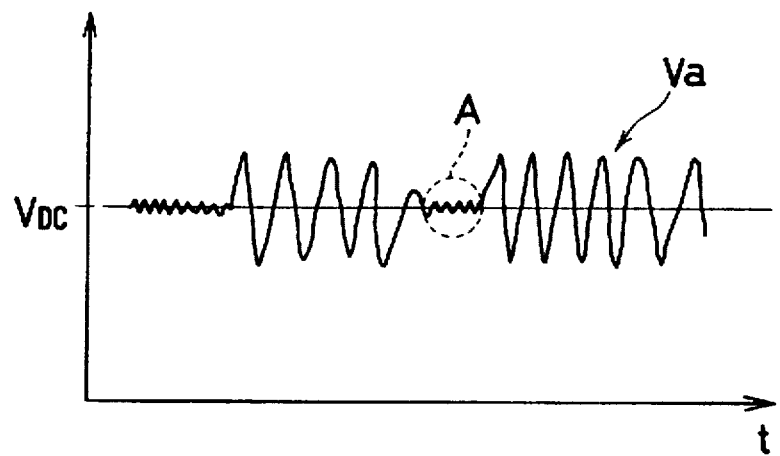
FIG. 23 is a waveform chart of a magnetic signal in which a film photographic information is partially missing.
Figure 24:
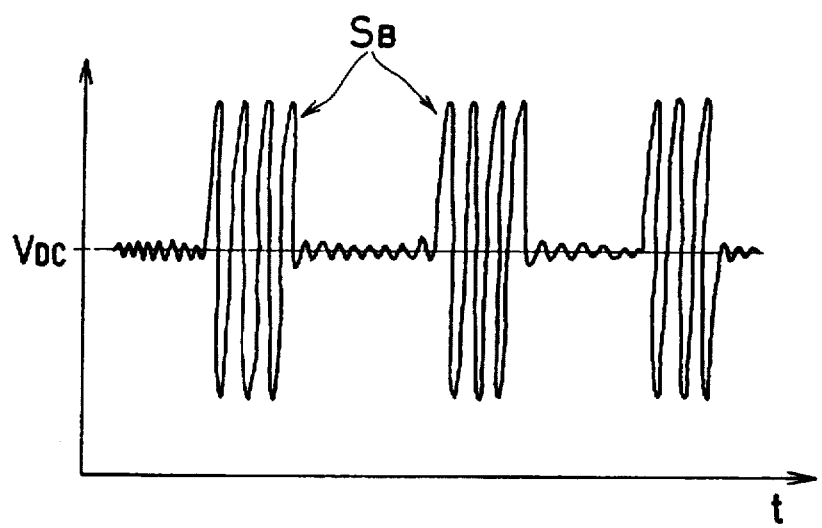
FIG. 24 is a waveform chart of a magnetic signal influenced by a burst-shaped noise.

FIG. 18 is a main flowchart of an unexposed frame judgment processing in the third control system. FIG. 19 is a flowchart showing a subroutine "Film Feed Speed Detection" of the unexposed frame judgment processing in the third control system. FIG. 20 is a flowchart showing a subroutine "Sampling Cycle Setting" of the unexposed frame judgment processing in the third control system, and FIG. 21 is a flowchart showing a subroutine "Per Block Magnetic Signal Judgment" of the unexposed frame judgment processing in the third control system.

The main flowchart shown in FIG. 18 differs from the one shown in FIG. 9 in a film feed speed detecting step and a sampling cycle setting step which are added between Steps corresponding to Steps#2,#4. Since the operations performed in Steps #110, #116 to #126 correspond to those performed in Steps #2. #4 to #14, only the film feed speed detection (Step #112) and the sampling cycle setting (Step #114) are described.

The film feed speed detection is performed in accordance with a subroutine "Film Feed Speed Detection", and the sampling cycle setting is performed in accordance with a subroutine "Sampling Cycle Setting".

When the feed of the film F is started, the film feed speed detector 81 calculates the feed speed V of the film F based on the rotating speed of the feed roller 3. Specifically, a rotation cycle Tr (τ×Np) of the feed roller 3 is calculated based on the pulse width τ of the pulse train signal output from the pulse detector 9 and the predetermined pulse number Np per rotation of the feed roller 3 (Step #130). The feed speed V is calculated from the rotation cycle Tr and a feed amount S of the film F per rotation of the feed roller 3 in accordance with an operational expression: V=S/Tr (Step #132).

Subsequently, the sampling cycle Ts is calculated based on the calculated film feed speed V in accordance with the operational expression Ts=0.177/(22×V) (Step #134). The above operation expression is used to calculate the sampling cycle Ts when there are 22 sampling data Ds in each block B(i) and the length of each block B(i) is constantly twice the minimum frequency fmin of the Ix-signal.

Since the length of the region of the Ix-signal corresponding to twice the minimum frequency fmin in the magnetic recording portion Fc is 2/(minimum bit density Db), a time required to scan this region (scanning period for one block) is 2/(minimum bit density Db ×film feed speed V). Since the number of sampling data Ds to be scanned during this scanning period is Nd, the sampling cycle Ts of the sampling data Ds is 2/(minimum bit density Db×film feed speed V×the number Nd of the sampling data Ds per block).

Since the minimum bit density Db=11.3 bits/mm and the number Nd of the sampling data Ds per block=22 in this embodiment, the sampling cycle Ts is calculated as follows: Ts=2/(11.3×22 ×V)=0.177/(22×V).

The length of the respective blocks and the number Nd of the sampling data Ds per block are not limited to those adopted in this embodiment, suitable values can be selectively set according to the recording level of the Ix-signal and the noise level.

Referring back to FIG. 18, if the sampling cycle Ts is set, the block unit signal judger 86 judges for each block B(i) whether the signal Sp includes the Ix-signal in accordance with a subroutine "Per block Magnetic Signal Judgment" (Step #116).

The subroutine "Per block Magnetic Signal Judgment" shown in FIG. 21 differs from the one shown in FIG. 10 in that a judgment criterion in Step #34, i.e., the number n of the sampling data Ds is changed from "90" to "22" and that the threshold value Nr of the Ix-signal in Step #36 is changed from "17" to "12". The threshold value Nr is changed based on the fact that the data number n of the sampling data Ds per block is changed from "90" to "22".

Since the magnetic signal judgment carried out according to the subroutine of FIG. 21 is essentially identical to the one carried out according to the subroutine of FIG. 10 except the judgment criteria, no detailed description is given thereto. According to the subroutine of FIG. 21, a judgment result as to whether the Ix-signal is included is output for each block B(i).

Upon completion of the magnetic signal judgment for all blocks B(0) to B(n-1) constituting the magnetic recording portion Fc (YES in Step #118), the feed of the film F is stopped (Step #120). It is then judged whether there are three or more consecutive blocks B(i) detected to include the Ix-signal by the unexposed frame detector 87 (Step #122). If the judgment result is in the affirmative (YES in Step #122), a signal representing that the frame is an exposed frame is output to, e.g., the camera controller (Step #124). If the judgment result is in the negative (NO in Step #122), a signal representing, that the frame is an unexposed frame is output to the camera controller (Step #126). Then, the unexposed frame judgment ends.

As described above, according to the invention, in an exposed frame judging device for, while feeding a film by a film feeder, detecting signals in recording portions in which an information concerning the photographing made for respective frames are recorded and which are provided so as to correspond to the respective frames by scanning the recording portions, and judging based on the detected signals whether the frames are unexposed, each recording portion is divided into a plurality of blocks, a judgment as to the presence or absence of the signal representing the photographic information is made for each block, and a judgment as to whether the frame is unexposed is made based on the above judgment result. This prevents the level of the detected signal from unstably varying and securely deters an erroneous detection even in the case that a burst-shaped noise is included, with the result that the unexposed frames can be detected with an improved accuracy.

Further, since the magnetic recording portion is divided into a plurality of blocks in accordance with a predetermined scanning period, the division into the blocks can be easily performed.

Further, since the magnetic recording portion is divided into a plurality of blocks in accordance with a film feed amount, the length of the respective blocks can be fixed independently of a film feed speed. Thus, the accuracy of judgment as to whether the signal representing the information between the blocks can be made uniform, with the result that the unexposed frames can be detected with a further improved accuracy.

Furthermore, the frame is judged to be an unexposed frame unless there are a predetermined number of consecutive blocks including the signal representing the above information. This securely prevents the detected signal from being erroneous detected to be the signal representing the above information even in the case that a burst shaped noise which has a large noise and is generated for a relatively short period is detected.

Although the present invention has been fully described by way of example with reference to the accompanying drawings, it is to be understood that various changes and modifications will be apparent to those skilled in the art. Therefore, unless such changes and modifications depart from the scope of the present invention, they should be construed as being included therein.

What is claimed is:

1. A judging device for judging an unexposed frame of a film having a magnetic recording portion recordable with a magnetic signal indicative of photographic information concerning an image for a frame, the judging device comprising:

a magnetic head which scans the magnetic recording portion to produce scanned data;

a divider which divides the magnetic recording portion into a plurality of blocks;

a first judger which is responsive to the divider and judges based on the scanned data whether each block bears the magnetic signal and which produces judgment results indicative thereof; and a second judger which is responsive to the first judger and judges based on said respective judgment results for blocks of the first judger whether the frame corresponding to the magnetic recording portion has been exposed.

2. A judging device as defined in claim 1, wherein the second judger executes judgment based on a number of consecutive blocks bearing the magnetic signal.

3. A judging device as defined in claim 2, wherein the second judger judges that the corresponding frame has been exposed when the number of consecutive blocks bearing the magnetic signal is greater than a predetermined value and judges that the corresponding frame has not been exposed when the number of consecutive blocks bearing the magnetic signal is smaller than the predetermined value.

4. A judging device as defined in claim 1, wherein the second judger executes judgment based on a result of moving average processing of judgment results of the first judger.

5. A judging device as defined in claim 1, further comprising a driver which causes a relative movement between the film and the magnetic head, wherein said divider divides the magnetic recording portion in accordance with divisions of time during which the magnetic head scans the magnetic recording portion on the film.

6. A judging device as defined in claim 5, wherein the second judger executes judgment based on a number of consecutive blocks bearing the magnetic signal.

7. A judging device as defined in claim 6, wherein the second judger judges that the corresponding frame has been exposed when the number of consecutive blocks bearing the magnetic signal is greater than a predetermined value and judges that the corresponding frame has not been exposed when the number of consecutive blocks bearing the magnetic signal is smaller than the predetermined value.

8. A judging device as defined in claim 5, wherein the second judger executes judgment based on a result of moving average processing of judgment results of the first judger.

9. A judging device as defined in claim 1, further comprising a driver which causes a relative movement between the film and the magnetic head, wherein said divider divides the magnetic recording portion in accordance with divisions of a relative movement amount between the magnetic recording portion of the film and the magnetic head.

10. A judging device as defined in claim 9, wherein the second judger executes judgment based on a number of consecutive blocks bearing the magnetic signal.

11. A judging device as defined in claim 10, wherein the second judger judges that the corresponding frame has been exposed when the number of consecutive blocks bearing the magnetic signal is greater than a predetermined value and judges that the corresponding frame has not been exposed when the number of consecutive blocks bearing the magnetic signal is smaller than the predetermined value.

12. A judging device as defined in claim 9, wherein the second judger executes its judgment based on a result of moving average processing of judgment results of the first judger.

13. A judging device as defined in claim 1, wherein:

the magnetic signal is represented by a pulse having a specified width; and the divider divides the magnetic recording portion at such an interval that each block covers the pulse.

14. A method for judging an unexposed frame of a film having a magnetic recording portion recordable with a magnetic signal indicative of photographic information concerning an image for a frame, the method comprising the steps of:

scanning the magnetic recording portion to produce scanned data;

providing divisions over the magnetic recording portion;

judging whether a magnetic signal is recorded on each division; and judging that the frame corresponding to the magnetic recording portion has been exposed when a number of consecutive divisions bearing the magnetic signal is greater than a predetermined value and that the corresponding frame has not been exposed when the number of consecutive divisions bearing the magnetic signal is smaller than the predetermined value.

15. A method for judging an unexposed frame of a film having a magnetic recording portion recordable with a magnetic signal indicative of photographic information concerning an image for a frame, the method comprising the steps of:

scanning the magnetic recording portion to produce scanned data;

providing divisions over the magnetic recording portion;

judging whether the magnetic signal is recorded on each division and producing judgment results indicative thereof;

executing a moving average processing on the respective judgment results for divisions; and judging based on a result of the moving average processing whether the frame corresponding to the magnetic recording portion has been exposed.

\* \* \* \* \*